United States Patent
Shimizu et al.

(10) Patent No.: US 8,817,671 B2
(45) Date of Patent: Aug. 26, 2014

(54) FULL DUPLEX TRANSMISSION CIRCUIT AND ELECTRONIC APPARATUS

(75) Inventors: Tatsuo Shimizu, Chiba (JP); Uichiro Omae, Kanagawa (JP)

(73) Assignee: Sony Corporation, Tokyo (JP)

( * ) Notice: Subject to any disclaimer, the term of this patent is extended or adjusted under 35 U.S.C. 154(b) by 144 days.

(21) Appl. No.: 13/325,489

(22) Filed: Dec. 14, 2011

(65) Prior Publication Data

US 2012/0163242 A1    Jun. 28, 2012

(30) Foreign Application Priority Data

Dec. 24, 2010    (JP) ................................. 2010-288543

(51) Int. Cl.
*H04B 1/56*    (2006.01)
*H03F 3/45*    (2006.01)

(52) U.S. Cl.
USPC .......................................... 370/276; 330/257

(58) Field of Classification Search
CPC .................................. H03F 3/245; H04B 1/18
USPC ........... 370/276; 330/254, 257, 296; 327/551; 345/211
See application file for complete search history.

(56) References Cited

U.S. PATENT DOCUMENTS

| | | | | |
|---|---|---|---|---|
| 5,389,895 A | * | 2/1995 | Moore et al. .................. | 330/257 |
| 5,432,477 A | * | 7/1995 | Nishiyama et al. ........... | 330/254 |
| 5,907,538 A | * | 5/1999 | White ............................ | 370/276 |
| 6,870,427 B2 | * | 3/2005 | Cathelin et al. ............... | 330/296 |
| 2006/0082570 A1 | * | 4/2006 | Noorbakhsh et al. ......... | 345/211 |
| 2006/0250180 A1 | * | 11/2006 | Hughes .......................... | 327/551 |

* cited by examiner

*Primary Examiner* — Helal A Algahaim
*Assistant Examiner* — Mahmoud Ismail
(74) *Attorney, Agent, or Firm* — Sony Corporation

(57) ABSTRACT

Disclosed herein is a full duplex transmission circuit including: a first internal input terminal receiving a signal to be transmitted; a second internal input terminal receiving a signal having an amplitude equal to ½ times the amplitude of the signal to be transmitted and having the same phase as the phase of the signal to be transmitted; an external input/output terminal; an internal output terminal; a first metal oxide semiconductor transistor; and the second metal oxide semiconductor transistor. A current generated by the current source as well as the sizes of the first and second metal oxide semiconductor transistors are set so that the transconductances of the first and second metal oxide semiconductor transistors become equal to 1/Z.

19 Claims, 14 Drawing Sheets

F I G. 1
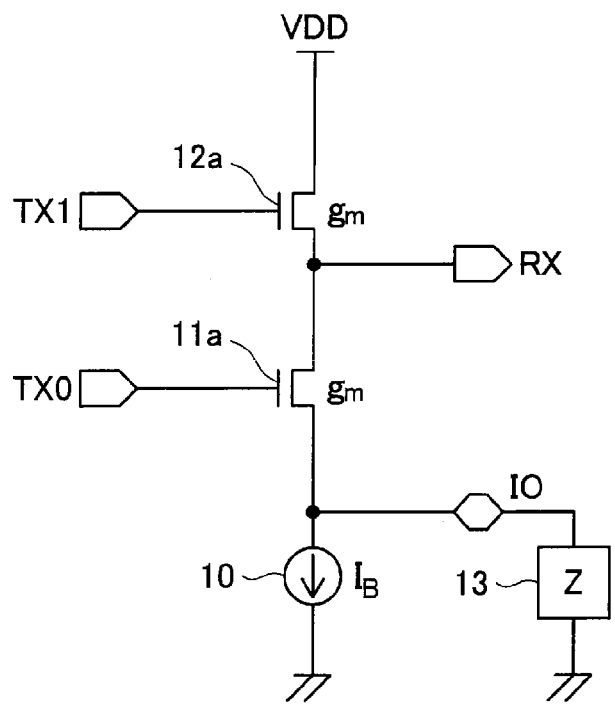
F I G. 2
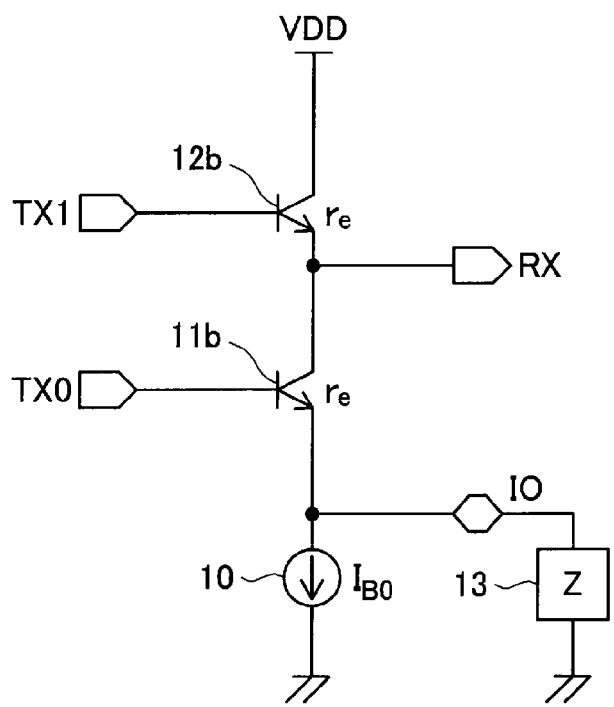

F I G. 3
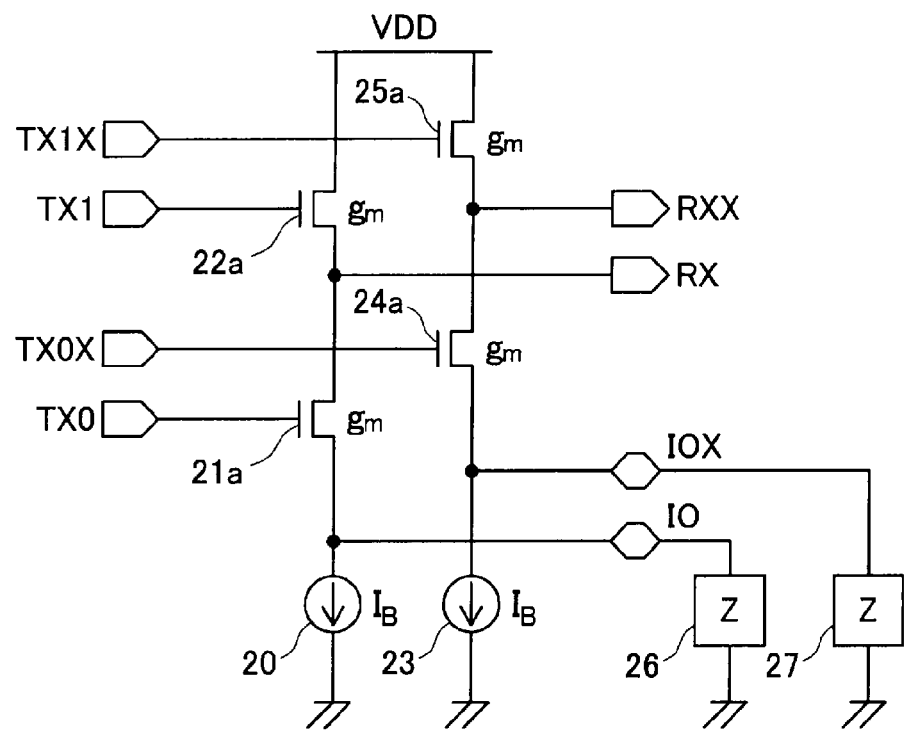
F I G. 4
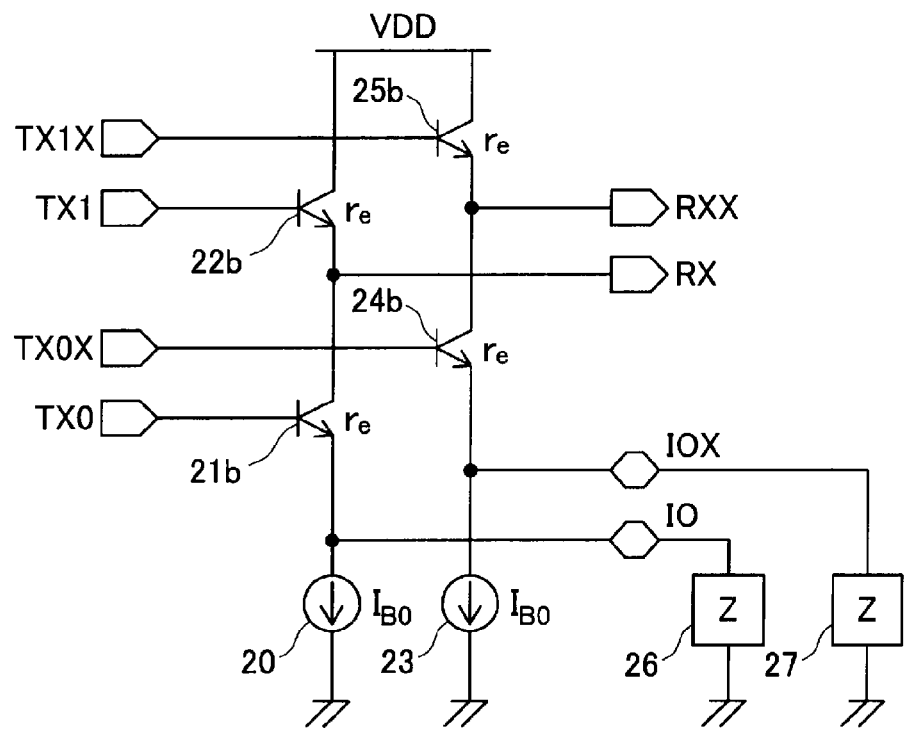

F I G. 9
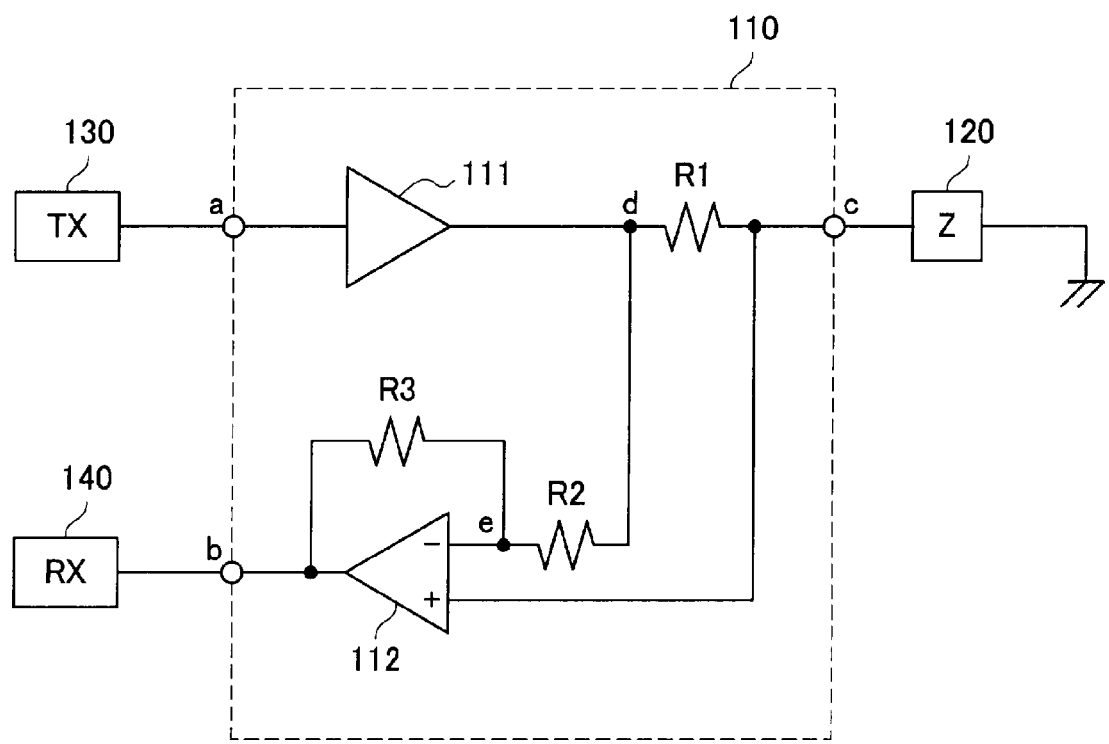

F I G. 2 1
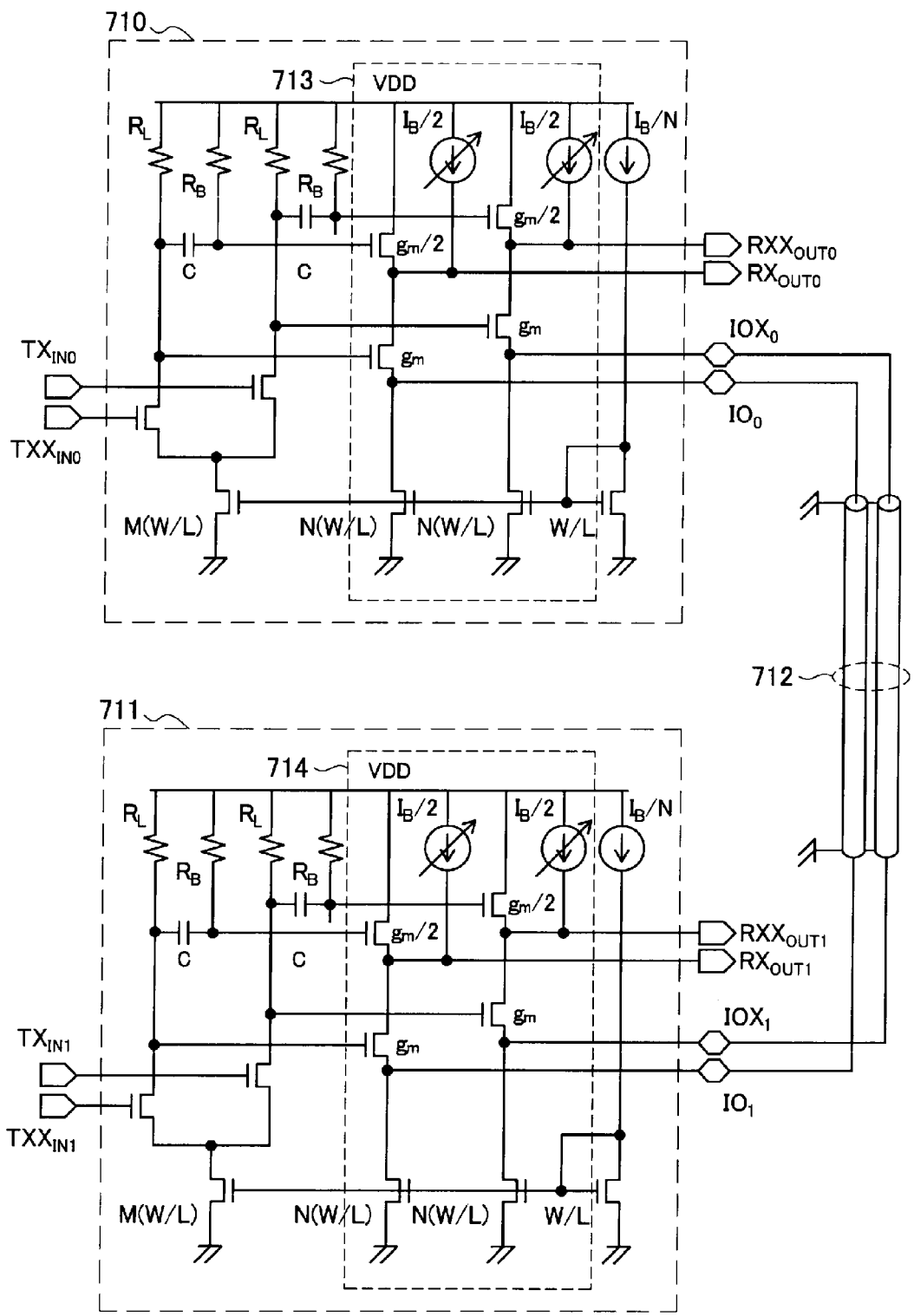

FULL DUPLEX TRANSMISSION CIRCUIT AND ELECTRONIC APPARATUS

BACKGROUND

The present disclosure relates to a full duplex transmission circuit and an electronic apparatus.

So far, as an apparatus for implementing duplex data transmissions, a hybrid circuit configured to include a resistor and an operational amplifier is used. For example, this hybrid circuit is used widely in typically analog front-end circuits of a data communication modem making use of a phone line and an ADSL (Asymmetric Digital Subscriber Line) modem. In addition, in order to implement high-speed differential data transmissions, there has been devised a hybrid circuit designed as a combination of a signal transmitting buffer and a signal receiving buffer. The signal transmitting buffer is a buffer configured to include a current source for outputting a current according to a signal to be transmitted and a load resistor. On the other hand, the signal receiving buffer is a buffer configured to include two amplifiers having gains different from each other. The configuration of this hybrid circuit is disclosed in documents such as Yasumoto, Tomita et al., "A 20 Gb/s Bidirectional Transceiver Using a Resistor-Transconductor Hybrid," ISSCC Dig. Tech. Papers, pp. 518-519, February 2006.

SUMMARY

In the hybrid circuit described above, a resistor is inserted in series with the transmission line into a location between the output terminal of the signal transmitting buffer and the output terminal of the hybrid circuit. In addition, a load resistor is inserted into the inside of the signal transmitting buffer. On top of that, one of the two amplifiers composing the signal receiving buffer undesirably operates to reduce the gain of a received signal while consuming electric power. Such a configuration inevitably entails an increase in power consumption. In addition, in an apparatus for implementing duplex data transmissions, both the signal transmitting buffer and the signal receiving buffer are operating at a data transmission time. Thus, in comparison with an apparatus for implementing semi-duplex data transmissions, the power consumption of the apparatus for implementing duplex data transmissions is large.

It is thus a desire of the present disclosure, which addresses the problems described above, to provide a full duplex transmission circuit capable of carrying out operations at a high speed and at a small power consumption and to provide an electronic apparatus employing the circuit.

In order to solve the problems described above, in accordance with an embodiment of the present disclosure, there is provided a full duplex transmission circuit including: a first internal input terminal receiving a signal to be transmitted; a second internal input terminal receiving a signal having an amplitude equal to ½ times the amplitude of the signal to be transmitted and having the same phase as the phase of the signal to be transmitted; an external input/output terminal connected to a transmission line having a characteristic impedance Z; and an internal output terminal being output a received signal input from the external input/output terminal. The full duplex transmission circuit includes a first metal oxide semiconductor transistor having the source thereof connected to a current source and the external input/output terminal, the gate thereof connected to the first internal input terminal and the drain thereof connected to the source of a second metal oxide semiconductor transistor and the internal output terminal; and the second metal oxide semiconductor transistor having the source thereof connected to the drain of the first metal oxide semiconductor transistor and the internal output terminal and the gate thereof connected to the second internal input terminal. A current generated by the current source as well as the sizes of the first and second metal oxide semiconductor transistors are set so that the transconductances of the first and second metal oxide semiconductor transistors become equal to 1/Z.

In order to solve the problems described above, in accordance with another embodiment of the present disclosure, there is provided a full duplex transmission circuit including: a first internal input terminal receiving a signal to be transmitted; a second internal input terminal receiving a signal having an amplitude equal to ½ times the amplitude of the signal to be transmitted and having the same phase as the phase of the signal to be transmitted; an external input/output terminal connected to a transmission line having a characteristic impedance Z; an internal output terminal being output a received signal input from the external input/output terminal; a first bipolar transistor having the emitter thereof connected to a current source and the external input/output terminal, the base thereof connected to the first internal input terminal and the collector thereof connected to the emitter of a second bipolar transistor and the internal output terminal; and the second bipolar transistor having the emitter thereof connected to the collector of the first bipolar transistor and the internal output terminal and the base thereof connected to the second internal input terminal. A current generated by the current source is set so that the resistance of the emitter of the first bipolar transistor becomes equal to Z.

In order to solve the problems described above, in accordance with further embodiment of the present disclosure, there is provided a full duplex transmission circuit including: a first internal input terminal receiving a first differential signal; a second internal input terminal receiving a signal having an amplitude equal to ½ times the amplitude of the first differential signal and having the same phase as the phase of the first differential signal; a third internal input terminal receiving a second differential signal forming a signal pair in conjunction with the first differential signal; and a fourth internal input terminal receiving a signal having an amplitude equal to ½ times the amplitude of the second differential signal and having the same phase as the phase of the second differential signal. The full duplex transmission circuit further includes: a first external input/output terminal connected to a first transmission line having a characteristic impedance Z; a second external input/output terminal connected to a second transmission line having a characteristic impedance Z; a first internal output terminal being output a third differential signal input from the first external input/output terminal; and a second internal output terminal being output a fourth differential signal input from the second external input/output terminal as a fourth differential signal forming a signal pair in conjunction with the third differential signal. The full duplex transmission circuit still includes: a first metal oxide semiconductor transistor having the source thereof connected to a first current source and the first external input/output terminal, the gate thereof connected to the first internal input terminal and the drain thereof connected to the source of a second metal oxide semiconductor transistor and the first internal output terminal; the second metal oxide semiconductor transistor having the source thereof connected to the drain of the first metal oxide semiconductor transistor and the first internal output terminal and the gate thereof connected to the second internal input terminal; a third metal oxide semiconductor transistor having the source thereof connected to a second current source and the second external input/output terminal, the gate thereof connected to the third internal input terminal and the drain thereof connected to the source of a fourth metal oxide semiconductor transistor and the second internal output terminal; and the fourth metal oxide semiconductor transistor having the source thereof connected to the drain of the third metal oxide semiconductor transistor and the second internal output terminal and the gate thereof connected to the fourth internal input terminal. A current generated by the first current source as well as the sizes of the first and second metal oxide semiconductor transistors are set so that the transconductances of the first and second metal oxide semiconductor transistors become equal to 1/Z. A current generated by the second current source as well as the sizes of the third and fourth metal oxide semiconductor transistors are set so that the transconductances of the third and fourth metal oxide semiconductor transistors become equal to 1/Z.

In order to solve the problems described above, in accordance with still further embodiment of the present disclosure, there is provided a full duplex transmission circuit including: a first internal input terminal receiving a first differential signal; a second internal input terminal receiving a signal having an amplitude equal to ½ times the amplitude of the first differential signal and having the same phase as the phase of the first differential signal; a third internal input terminal receiving a second differential signal forming a signal pair in conjunction with the first differential signal; and a fourth internal input terminal receiving a signal having an amplitude equal to ½ times the amplitude of the second differential signal and having the same phase as the phase of the second differential signal. The full duplex transmission circuit further includes: a first external input/output terminal connected to a first transmission line having a characteristic impedance Z; a second external input/output terminal connected to a second transmission line having a characteristic impedance Z; a first internal output terminal being output a third differential signal input from the first external input/output terminal; and a second internal output terminal being output a fourth differential signal input from the second external input/output terminal as a fourth differential signal forming a signal pair in conjunction with the third differential signal. The full duplex transmission circuit still includes: a first bipolar transistor having the emitter thereof connected to a first current source and the first external input/output terminal, the base thereof connected to the first internal input terminal and the collector thereof connected to the emitter of a second bipolar transistor and the first internal output terminal; the second bipolar transistor having the emitter thereof connected to the collector of the first bipolar transistor and the first internal output terminal and the base thereof connected to the second internal input terminal; a third bipolar transistor having the emitter thereof connected to a second current source and the second external input/output terminal, the base thereof connected to the third internal input terminal and the collector thereof connected to the emitter of a fourth bipolar transistor and the second internal output terminal; and the fourth bipolar transistor having the emitter thereof connected to the collector of the third bipolar transistor and the second internal output terminal and the base thereof connected to the fourth internal input terminal. A current generated by the first current source is set so that the resistance of the emitter of the first bipolar transistor becomes equal to Z. A current generated by the second current source is set so that the resistance of the emitter of the second bipolar transistor becomes equal to Z.

In addition, in order to solve the problems described above, in accordance with an embodiment of the present disclosure, there is provided a full duplex transmission circuit including: a first internal input terminal receiving a signal to be transmitted; a second internal input terminal receiving a signal having an amplitude equal to G/2 times the amplitude of the signal to be transmitted, where G>1, and having the same phase as the phase of the signal to be transmitted; and an external input/output terminal connected to a transmission line having a characteristic impedance Z;

an internal output terminal being output a received signal input from the external input/output terminal. The full duplex transmission circuit further includes: a first metal oxide semiconductor transistor having the source thereof connected to a first current source and the external input/output terminal, the gate thereof connected to the first internal input terminal and the drain thereof connected to the source of a second metal oxide semiconductor transistor and the internal output terminal; and the second metal oxide semiconductor transistor having the source thereof connected to the drain of the first metal oxide semiconductor transistor, the second current source and the internal output terminal and the gate thereof connected to the second internal input terminal. A current generated by the first current source and the size of the first metal oxide semiconductor transistor are set so that the transconductance of the first metal oxide semiconductor transistor becomes equal to 1/Z. A current generated by the second current source and the size of the second metal oxide semiconductor transistor are set so that the transconductance of the second metal oxide semiconductor transistor becomes equal to 1/G times the transconductance of the first metal oxide semiconductor transistor.

Also, in order to solve the problems described above, in accordance with another embodiment of the present disclosure, there is provided a full duplex transmission circuit including: a first internal input terminal receiving a signal to be transmitted; a second internal input terminal receiving a signal having an amplitude equal to G/2 times the amplitude of the signal to be transmitted, where G>1, and having the same phase as the phase of the signal to be transmitted; an external input/output terminal connected to a transmission line having a characteristic impedance Z; and an internal output terminal being output a received signal input from the external input/output terminal. The full duplex transmission circuit further includes: a first bipolar transistor having the emitter thereof connected to a first current source and the external input/output terminal, the base thereof connected to the first internal input terminal and the collector thereof connected to the emitter of a second bipolar transistor and the internal output terminal; and the second bipolar transistor having the emitter thereof connected to the collector of the first bipolar transistor, the second current source and the internal output terminal and the base thereof connected to the second internal input terminal. A current generated by the first current source is set so that the resistance of the emitter of the first bipolar transistor becomes equal to Z. A current generated by the second current source is set so that the resistance of the emitter of the second bipolar transistor becomes equal to G times the resistance of the emitter of the first bipolar transistor.

In order to solve the problems described above, in accordance with further embodiment of the present disclosure, there is provided a full duplex transmission circuit including: a first internal input terminal receiving a first differential signal; a second internal input terminal receiving a signal having an amplitude equal to G/2 times the amplitude of the first differential signal, where G>1, and having the same phase as the phase of the first differential signal; a third internal input terminal receiving a second differential signal forming a signal pair in conjunction with the first differential signal; and a fourth internal input terminal receiving a signal having an amplitude equal to G/2 times the amplitude of the second differential signal and having the same phase as the phase of the second differential signal. The full duplex transmission circuit further includes: a first external input/output terminal connected to a first transmission line having a characteristic impedance Z; a second external input/output terminal connected to a second transmission line having a characteristic impedance Z; a first internal output terminal being output a third differential signal input from the first external input/output terminal; and a second internal output terminal being output a fourth differential signal input from the second external input/output terminal as a fourth differential signal forming a signal pair in conjunction with the third differential signal. The full duplex transmission circuit still includes: a first metal oxide semiconductor transistor having the source thereof connected to a first current source and the first external input/output terminal, the gate thereof connected to the first internal input terminal and the drain thereof connected to the source of a second metal oxide semiconductor transistor and the first internal output terminal; the second metal oxide semiconductor transistor having the source thereof connected to the drain of the first metal oxide semiconductor transistor, the second current source and the first internal output terminal and the gate thereof connected to the second internal input terminal; a third metal oxide semiconductor transistor having the source thereof connected to a third current source and the second external input/output terminal, the gate thereof connected to the third internal input terminal and the drain thereof connected to the source of a fourth metal oxide semiconductor transistor and the second internal output terminal; and the fourth metal oxide semiconductor transistor having the source thereof connected to the drain of the third metal oxide semiconductor transistor, the fourth current source and the second internal output terminal and the gate thereof connected to the fourth internal input terminal. A current generated by the first current source and the size of the first metal oxide semiconductor transistor are set so that the transconductance of the first metal oxide semiconductor transistor becomes equal to 1/Z. A current generated by the second current source and the size of the second metal oxide semiconductor transistor are set so that the transconductance of the second metal oxide semiconductor transistor becomes equal to 1/G times the transconductance of the first metal oxide semiconductor transistor. A current generated by the third current source and the size of the third metal oxide semiconductor transistor are set so that the transconductance of the third metal oxide semiconductor transistor becomes equal to 1/Z. A current generated by the fourth current source and the size of the fourth metal oxide semiconductor transistor are set so that the transconductance of the fourth metal oxide semiconductor transistor becomes equal to 1/G times the transconductance of the third metal oxide semiconductor transistor.

Also, in order to solve the problems described above, in accordance with still further embodiment of the present disclosure, there is provided a full duplex transmission circuit including: a first internal input terminal receiving a first differential signal; a second internal input terminal receiving a signal having an amplitude equal to G/2 times the amplitude of the first differential signal, where G>1, and having the same phase as the phase of the first differential signal; a third internal input terminal receiving a second differential signal forming a signal pair in conjunction with the first differential signal; and a fourth internal input terminal receiving a signal having an amplitude equal to G/2 times the amplitude of the second differential signal and having the same phase as the phase of the second differential signal. The full duplex transmission circuit further includes: a first external input/output terminal connected to a first transmission line having a characteristic impedance Z; and a second external input/output terminal connected to a second transmission line having a characteristic impedance Z. The full duplex transmission circuit still includes: a first internal output terminal being output a third differential signal input from the first external input/output terminal; and a second internal output terminal being output a fourth differential signal input from the second external input/output terminal as a fourth differential signal forming a signal pair in conjunction with the third differential signal. The full duplex transmission circuit also includes: a first bipolar transistor having the emitter thereof connected to a first current source and the first external input/output terminal, the base thereof connected to the first internal input terminal and the collector thereof connected to the emitter of a second bipolar transistor and the first internal output terminal; the second bipolar transistor having the emitter thereof connected to the collector of the first bipolar transistor, the second current source and the first internal output terminal and the base thereof connected to the second internal input terminal; a third bipolar transistor having the emitter thereof connected to a third current source and the second external input/output terminal, the base thereof connected to the third internal input terminal and the collector thereof connected to the emitter of a fourth bipolar transistor and the second internal output terminal; and the fourth bipolar transistor having the emitter thereof connected to the collector of the third bipolar transistor, the fourth current source and the second internal output terminal and the base thereof connected to the fourth internal input terminal. A current generated by the first current source is set so that the resistance of the emitter of the first bipolar transistor becomes equal to Z. A current generated by the second current source is set so that the resistance of the emitter of the second bipolar transistor becomes equal to G times the resistance of the emitter of the first bipolar transistor. A current generated by the third current source is set so that the resistance of the emitter of the third bipolar transistor becomes equal to Z. A current generated by the fourth current source is set so that the resistance of the emitter of the fourth bipolar transistor becomes equal to G times the resistance of the emitter of the third bipolar transistor.

In order to solve the problems described above, in accordance with an embodiment of the present disclosure, there is provided an electronic apparatus including: a first full duplex transmission circuit; a second full duplex transmission circuit; and a transmission line used for connecting the external input/output terminal of the first full duplex transmission circuit to the external input/output terminal of the second full duplex transmission circuit. The first and second full duplex transmission circuits include a first internal input terminal receiving a signal to be transmitted, a second internal input terminal receiving a signal having an amplitude equal to ½ times the amplitude of the signal to be transmitted and having the same phase as the phase of the signal to be transmitted, an external input/output terminal connected to a transmission line having a characteristic impedance Z, an internal output terminal being output a received signal input from the external input/output terminal, a first metal oxide semiconductor transistor having the source thereof connected to a current source and the external input/output terminal, the gate thereof connected to the first internal input terminal and the drain thereof connected to the source of a second metal oxide semiconductor transistor and the internal output terminal, and the second metal oxide semiconductor transistor having the source thereof connected to the drain of the first metal oxide semiconductor transistor and the internal output terminal and the gate thereof connected to the second internal input terminal. A current generated by the current source as well as the sizes of the first and second metal oxide semiconductor transistors are set so that the transconductances of the first and second metal oxide semiconductor transistors become equal to $1/Z$.

In addition, in order to solve the problems described above, in accordance with another embodiment of the present disclosure, there is provided an electronic apparatus including: a first full duplex transmission circuit; a second full duplex transmission circuit; and a transmission line used for connecting the external input/output terminal of the first full duplex transmission circuit to the external input/output terminal of the second full duplex transmission circuit. The first and second full duplex transmission circuits include a first internal input terminal receiving a signal to be transmitted, a second internal input terminal receiving a signal having an amplitude equal to ½ times the amplitude of the signal to be transmitted and having the same phase as the phase of the signal to be transmitted, an external input/output terminal connected to a transmission line having a characteristic impedance Z, an internal output terminal being output a received signal input from the external input/output terminal, first bipolar transistor having the emitter thereof connected to a current source and the external input/output terminal, the base thereof connected to the first internal input terminal and the collector thereof connected to the emitter of a second bipolar transistor and the internal output terminal, and the second bipolar transistor having the emitter thereof connected to the collector of the first bipolar transistor and the internal output terminal and the base thereof connected to the second internal input terminal. A current generated by the current source is set so that the resistance of the emitter of the first bipolar transistor becomes equal to Z.

In order to solve the problems described above, in accordance with further embodiment of the present disclosure, there is provided an electronic apparatus including: a first full duplex transmission circuit; a second full duplex transmission circuit; and first and second transmission lines used for connecting the first and second external input/output terminals of the first full duplex transmission circuit to the first and second external input/output terminals of the second full duplex transmission circuit. The first and second full duplex transmission circuits include a first internal input terminal receiving a first differential signal, a second internal input terminal receiving a signal having an amplitude equal to ½ times the amplitude of the first differential signal and having the same phase as the phase of the first differential signal, a third internal input terminal receiving a second differential signal forming a signal pair in conjunction with the first differential signal, and a fourth internal input terminal receiving a signal having an amplitude equal to ½ times the amplitude of the second differential signal and having the same phase as the phase of the second differential signal. The first and second full duplex transmission circuits also include a first external input/output terminal connected to a first transmission line having a characteristic impedance Z, a second external input/output terminal connected to a second transmission line having a characteristic impedance Z, a first internal output terminal being output a third differential signal input from the first external input/output terminal, and a second internal output terminal being output a fourth differential signal input from the second external input/output terminal as a fourth differential signal forming a signal pair in conjunction with the third differential signal. The first and second full duplex transmission circuits further include a first metal oxide semiconductor transistor having the source thereof connected to a first current source and the first external input/output terminal, the gate thereof connected to the first internal input terminal and the drain thereof connected to the source of a second metal oxide semiconductor transistor and the first internal output terminal, the second metal oxide semiconductor transistor having the source thereof connected to the drain of the first metal oxide semiconductor transistor and the first internal output terminal and the gate thereof connected to the second internal input terminal, a third metal oxide semiconductor transistor having the source thereof connected to a second current source and the second external input/output terminal, the gate thereof connected to the third internal input terminal and the drain thereof connected to the source of a fourth metal oxide semiconductor transistor and the second internal output terminal, and the fourth metal oxide semiconductor transistor having the source thereof connected to the drain of the third metal oxide semiconductor transistor and the second internal output terminal and the gate thereof connected to the fourth internal input terminal. A current generated by the first current source as well as the sizes of the first and second metal oxide semiconductor transistors are set so that the transconductances of the first and second metal oxide semiconductor transistors become equal to $1/Z$. A current generated by the second current source as well as the sizes of the third and fourth metal oxide semiconductor transistors are set so that the transconductances of the third and fourth metal oxide semiconductor transistors become equal to $1/Z$.

In order to solve the problems described above, in accordance with still further embodiment of the present disclosure, there is provided an electronic apparatus including: a first full duplex transmission circuit; a second full duplex transmission circuit; and first and second transmission lines used for connecting the first and second external input/output terminals of the first full duplex transmission circuit to the first and second external input/output terminals of the second full duplex transmission circuit. The first and second full duplex transmission circuits include a first internal input terminal receiving a first differential signal, a second internal input terminal receiving a signal having an amplitude equal to ½ times the amplitude of the first differential signal and having the same phase as the phase of the first differential signal, a third internal input terminal receiving a second differential signal forming a signal pair in conjunction with the first differential signal, a fourth internal input terminal receiving a signal having an amplitude equal to ½ times the amplitude of the second differential signal and having the same phase as the phase of the second differential signal, a first external input/output terminal connected to a first transmission line having a characteristic impedance Z, and a second external input/output terminal connected to a second transmission line having a characteristic impedance Z. The first and second full duplex transmission circuits also include a first internal output terminal being output a third differential signal input from the first external input/output terminal, a second internal output terminal being output a fourth differential signal input from the second external input/output terminal as a fourth differential signal forming a signal pair in conjunction with the third differential signal, a first bipolar transistor having the emitter thereof connected to a first current source and the first external input/output terminal, the base thereof connected to the first internal input terminal and the collector thereof connected to the emitter of a second bipolar transistor and the first internal output terminal, the second bipolar transistor having the emitter thereof connected to the collector of the first bipolar transistor and the first internal output terminal and the base thereof connected to the second internal input terminal, a third bipolar transistor having the emitter thereof connected to a second current source and the second external input/output terminal, the base thereof connected to the third internal input terminal and the collector thereof connected to the emitter of a fourth bipolar transistor and the second internal output terminal, and the fourth bipolar transistor having the emitter thereof connected to the collector of the third bipolar transistor and the second internal output terminal and the base thereof connected to the fourth internal input terminal. A current generated by the first current source is set so that the resistance of the emitter of the first bipolar transistor becomes equal to Z. A current generated by the second current source is set so that the resistance of the emitter of the second bipolar transistor becomes equal to Z.

In order to solve the problems described above, in accordance with an embodiment of the present disclosure, there is provided an electronic apparatus including: a first full duplex transmission circuit; a second full duplex transmission circuit; and a transmission line used for connecting the external input/output terminal of the first full duplex transmission circuit to the external input/output terminal of the second full duplex transmission circuit. The first and second full duplex transmission circuits include a first internal input terminal receiving a signal to be transmitted, a second internal input terminal receiving a signal having an amplitude equal to G/2 times the amplitude of the signal to be transmitted, where G>1, and having the same phase as the phase of the signal to be transmitted, an external input/output terminal connected to a transmission line having a characteristic impedance Z, an internal output terminal being output a received signal input from the external input/output terminal, a first metal oxide semiconductor transistor having the source thereof connected to a first current source and the external input/output terminal, the gate thereof connected to the first internal input terminal and the drain thereof connected to the source of a second metal oxide semiconductor transistor and the internal output terminal, and the second metal oxide semiconductor transistor having the source thereof connected to the drain of the first metal oxide semiconductor transistor, the second current source and the internal output terminal and the gate thereof connected to the second internal input terminal. A current generated by the first current source and the size of the first metal oxide semiconductor transistor are set so that the transconductance of the first metal oxide semiconductor transistor becomes equal to 1/Z. A current generated by the second current source and the size of the second metal oxide semiconductor transistor are set so that the transconductance of the second metal oxide semiconductor transistor becomes equal to 1/G times the transconductance of the first metal oxide semiconductor transistor.

In order to solve the problems described above, in accordance with another embodiment of the present disclosure, there is provided an electronic apparatus including: a first full duplex transmission circuit; a second full duplex transmission circuit; and a transmission line used for connecting the external input/output terminal of the first full duplex transmission circuit to the external input/output terminal of the second full duplex transmission circuit. The first and second full duplex transmission circuits include a first internal input terminal receiving a signal to be transmitted, a second internal input terminal receiving a signal having an amplitude equal to G/2 times the amplitude of the signal to be transmitted, where G>1, and having the same phase as the phase of the signal to be transmitted, an external input/output terminal connected to a transmission line having a characteristic impedance Z, an internal output terminal being output a received signal input from the external input/output terminal, a first bipolar transistor having the emitter thereof connected to a first current source and the external input/output terminal, the base thereof connected to the first internal input terminal and the collector thereof connected to the emitter of a second bipolar transistor and the internal output terminal, and the second bipolar transistor having the emitter thereof connected to the collector of the first bipolar transistor, the second current source and the internal output terminal and the base thereof connected to the second internal input terminal. A current generated by the first current source is set so that the resistance of the emitter of the first bipolar transistor becomes equal to Z. A current generated by the second current source is set so that the resistance of the emitter of the second bipolar transistor becomes equal to G times the resistance of the emitter of the first bipolar transistor.

In order to solve the problems described above, in accordance with further embodiment of the present disclosure, there is provided an electronic apparatus including: a first full duplex transmission circuit; a second full duplex transmission circuit; and first and second transmission lines used for connecting the first and second external input/output terminals of the first full duplex transmission circuit to the first and second external input/output terminals of the second full duplex transmission circuit. The first and second full duplex transmission circuits include a first internal input terminal receiving a first differential signal, a second internal input terminal receiving a signal having an amplitude equal to G/2 times the amplitude of the first differential signal, where G>1, and having the same phase as the phase of the first differential signal, a third internal input terminal receiving a second differential signal forming a signal pair in conjunction with the first differential signal, a fourth internal input terminal receiving a signal having an amplitude equal to G/2 times the amplitude of the second differential signal and having the same phase as the phase of the second differential signal, a first external input/output terminal connected to a first transmission line having a characteristic impedance Z, and a second external input/output terminal connected to a second transmission line having a characteristic impedance Z. The first and second full duplex transmission circuits also include a first internal output terminal being output a third differential signal input from the first external input/output terminal, a second internal output terminal being output a fourth differential signal input from the second external input/output terminal as a fourth differential signal forming a signal pair in conjunction with the third differential signal, a first metal oxide semiconductor transistor having the source thereof connected to a first current source and the first external input/output terminal, the gate thereof connected to the first internal input terminal and the drain thereof connected to the source of a second metal oxide semiconductor transistor and the first internal output terminal, the second metal oxide semiconductor transistor having the source thereof connected to the drain of the first metal oxide semiconductor transistor, the second current source and the first internal output terminal and the gate thereof connected to the second internal input terminal, a third metal oxide semiconductor transistor having the source thereof connected to a third current source and the second external input/output terminal, the gate thereof connected to the third internal input terminal and the drain thereof connected to the source of a fourth metal oxide semiconductor transistor and the second internal output terminal, and the fourth metal oxide semiconductor transistor having the source thereof connected to the drain of the third metal oxide semiconductor transistor, the fourth current source and the second internal output terminal and the gate thereof connected to the fourth internal input terminal. A current generated by the first current source and the size of the first metal oxide semiconductor transistor are set so that the transconductance of the first metal oxide semiconductor transistor becomes equal to 1/Z. A current generated by the second current source and the size of the second metal oxide semiconductor transistor are set so that the transconductance of the second metal oxide semiconductor transistor becomes equal to 1/G times the transconductance of the first metal oxide semiconductor transistor. A current generated by the third current source and the size of the third metal oxide semiconductor transistor are set so that the transconductance of the third metal oxide semiconductor transistor becomes equal to 1/Z. A current generated by the fourth current source and the size of the fourth metal oxide semiconductor transistor are set so that the transconductance of the fourth metal oxide semiconductor transistor becomes equal to 1/G times the transconductance of the third metal oxide semiconductor transistor.

In order to solve the problems described above, in accordance with still further embodiment of the present disclosure, there is provided an electronic apparatus including: a first full duplex transmission circuit; a second full duplex transmission circuit; and first and second transmission lines used for connecting the first and second external input/output terminals of the first full duplex transmission circuit to the first and second external input/output terminals of the second full duplex transmission circuit. The first and second full duplex transmission circuits include a first internal input terminal receiving a first differential signal, a second internal input terminal receiving a signal having an amplitude equal to G/2 times the amplitude of the first differential signal, where G>1, and having the same phase as the phase of the first differential signal, a third internal input terminal receiving a second differential signal forming a signal pair in conjunction with the first differential signal, a fourth internal input terminal receiving a signal having an amplitude equal to G/2 times the amplitude of the second differential signal and having the same phase as the phase of the second differential signal, a first external input/output terminal connected to a first transmission line having a characteristic impedance Z, and a second external input/output terminal connected to a second transmission line having a characteristic impedance Z. The first and second full duplex transmission circuits also include a first internal output terminal being output a third differential signal input from the first external input/output terminal, a second internal output terminal being output a fourth differential signal input from the second external input/output terminal as a fourth differential signal forming a signal pair in conjunction with the third differential signal, a first bipolar transistor having the emitter thereof connected to a first current source and the first external input/output terminal, the base thereof connected to the first internal input terminal and the collector thereof connected to the emitter of a second bipolar transistor and the first internal output terminal, the second bipolar transistor having the emitter thereof connected to the collector of the first bipolar transistor, the second current source and the first internal output terminal and the base thereof connected to the second internal input terminal, a third bipolar transistor having the emitter thereof connected to a third current source and the second external input/output terminal, the base thereof connected to the third internal input terminal and the collector thereof connected to the emitter of a fourth bipolar transistor and the second internal output terminal, and the fourth bipolar transistor having the emitter thereof connected to the collector of the third bipolar transistor, the fourth current source and the second internal output terminal and the base thereof connected to the fourth internal input terminal. A current generated by the first current source is set so that the resistance of the emitter of the first bipolar transistor becomes equal to Z. A current generated by the second current source is set so that the resistance of the emitter of the second bipolar transistor becomes equal to G times the resistance of the emitter of the first bipolar transistor. A current generated by the third current source is set so that the resistance of the emitter of the third bipolar transistor becomes equal to Z. A current generated by the fourth current source is set so that the resistance of the emitter of the fourth bipolar transistor becomes equal to G times the resistance of the emitter of the third bipolar transistor.

Also, the above-described electronic apparatus may further include a processing section generating a signal of image data and a display section displaying the image data. In this case, the signal of the image data is supplied to the internal input terminal of the first full duplex transmission circuit, transmitted to the second full duplex transmission circuit through the transmission line, output from the internal output terminal of the second full duplex transmission circuit and supplied to the display section.

As described above, in accordance with an embodiment of the present disclosure, it is possible to provide a full duplex transmission circuit capable of operating at a high speed and at a small power consumption and provide an electronic apparatus employing the full duplex transmission circuit.

BRIEF DESCRIPTION OF THE DRAWINGS

FIG. 1 is an explanatory diagram showing a typical circuit configuration of a full duplex transmission circuit employing MOS (Metal Oxide Semiconductor) transistors in accordance with an embodiment of the present disclosure;

FIG. 2 is an explanatory diagram showing a typical circuit configuration of a full duplex transmission circuit employing bipolar transistors in accordance with the same embodiment;

FIG. 3 is an explanatory diagram showing a typical circuit configuration of a full duplex transmission circuit employing MOS transistors to implement a differential transmission method in accordance with an embodiment of the present disclosure;

FIG. 4 is an explanatory diagram showing a typical circuit configuration of a full duplex transmission circuit employing bipolar transistors to implement the differential transmission method in accordance with the same embodiment;

FIG. 9 is an explanatory diagram showing a typical full duplex transmission circuit making use of an ordinary hybrid circuit configured to include resistors and an operational amplifier;

FIG. 21 is an explanatory diagram to be referred to in description of the configuration of an electronic apparatus carrying out duplex data transmissions between full duplex transmission circuits each having a differential-signal-based implementation of the modified configuration according to the same embodiment.

DETAILED DESCRIPTION OF THE PREFERRED EMBODIMENTS

Figure 5:
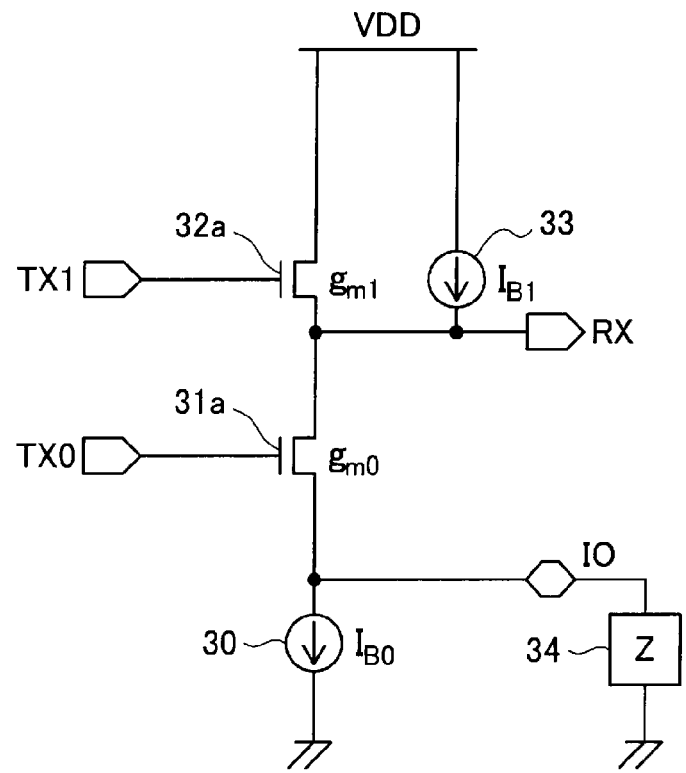
FIG. 5 is an explanatory diagram showing the circuit configuration of a typical modification of a full duplex transmission circuit employing MOS transistors in accordance with an embodiment of the present disclosure.

Preferred embodiments of the present disclosure are explained below in detail by referring to the diagrams. It is to be noted that, in this specification of the present disclosure and in the diagrams, configuration elements having substantially the same functional configuration are denoted by the same reference numeral and, thus, are explained once to avoid duplications of descriptions.

Flow of Explanation

The following description briefly explains the flow of explanation of the embodiments implementing the present disclosure. First of all, the configuration of an ordinary full duplex transmission circuit is briefly explained by referring to FIGS. 9 and 10. To be more specific, technological problems raised by the ordinary full duplex transmission circuit are described briefly. Then, the configurations of full duplex transmission circuits according to embodiments are explained by referring to FIGS. 1 to 8. Subsequently, operations carried out by the full duplex transmission circuits according to the embodiments are explained by referring to FIGS. 12 to 17. Then, methods for applying the full duplex transmission circuits according to the embodiments to electronic apparatuses are explained by referring to FIGS. 18 to 21. Finally, technological concepts according to the embodiments are summarized and effects obtained from the technological concepts are described briefly.

Chapters in Explanation

1: Introduction (Explanation of Ordinary Full Duplex Transmission Circuits)

2: Embodiments 2-1: Configurations of Full Duplex Transmission Circuits (Explanation of Principles)

2-1-1: First Configuration (Basic Configuration Using MOS Transistors)

2-1-2: Second Configuration (Basic Configuration Using Bipolar Transistors)

2-1-3: Third Configuration (Differential Implementation of Basic Configuration Using MOS Transistors)

2-1-4: Fourth Configuration (Differential Implementation of Basic Configuration Using Bipolar Transistors)

2-1-5: Fifth Configuration (Typical Modification Using MOS Transistors)

2-1-6: Sixth Configuration (Typical Modification Using Bipolar Transistors)

2-1-7: Seventh Configuration (Differential Configuration of Typical Modification Using MOS Transistors)

2-1-8: Eighth Configuration (Differential Configuration of Typical Modification Using Bipolar Transistors)

2-2: Operations of Full Duplex Transmission Circuits 2-2-1: Operations of First Configuration (Basic Configuration)

2-2-2: Operations of Fifth Configuration (Typical Modification)

2-3: Typical Applications to Apparatus Internal Transmissions 2-3-1: Typical Application of First Configuration (Basic Configuration)

2-3-2: Typical Application of Fifth Configuration (Typical Modification)

2-3-3: Typical Application of Third Configuration (Differential Implementation of Basic Configuration)

2-3-4: Typical Application of Seventh Configuration (Differential Implementation of Typical Modification)

3: Conclusions

1: Introduction

Explanation of Ordinary Full Duplex Transmission Circuits

First of all, the following description briefly explains the configuration of an ordinary full duplex transmission circuit and problems raised by the full duplex transmission circuit.

First Example of Typical Ordinary Full Duplex Transmission Circuit #1

First of all, the reader is requested to refer to FIG. 9. FIG. 9 is an explanatory diagram showing a typical full duplex transmission circuit making use of an ordinary hybrid circuit configured to include resistors and an operational amplifier.

As shown in the figure, this full duplex transmission circuit employs a hybrid circuit 110, a signal transmitting section 130, a signal receiving section 140 and a transmission line 120. The hybrid circuit 110 has a signal transmitting buffer 111 and a signal receiving buffer which includes an amplifier 112 as well as resistors R2 and R3. In the following description, for the sake of simplicity, the impedance Z of the transmission line 120 is assumed to have a real part representing a resistance. In addition, the amplifier 112 is regarded as an ideal operational amplifier. That is to say, the equation c=d is assumed to hold true or, in other words, an electric potential appearing at a point c is assumed to be equal to an electric potential appearing at a point d. On top of that, the output terminal of the signal transmitting buffer 111 is regarded as an ideal voltage source and the output impedance of the signal transmitting buffer 111 is assumed to be 0Ω.

An output impedance looking at the terminal c of the hybrid circuit 110 from the outside is a resistor R1. In addition, in order to implement matching of the impedances of the hybrid circuit 110 and the transmission line 120, it is necessary to adjust the resistance of the resistor R1 so as to satisfy the equation R1=Z. On top of that, in order to prevent a signal d output by the signal transmitting buffer 111 from sneaking around to the signal receiving section 140 by way of the amplifier 112, it is necessary to adjust the resistors R2 and R3 so as to satisfy the equations R2/R3=R1/Z=1.

A signal a supplied from the signal transmitting section 130 to the hybrid circuit 110 is output to the node d from the signal transmitting buffer 111 and propagates to the transmission line 120 by way of the resistor R1. A signal c output by the hybrid circuit 110 can be computed from a signal d on the basis of a ratio found from the resistances R1 and Z in accordance with the following equation:

$$c=d*Z/(R1+Z)=d/2$$

That is to say, a power having a magnitude equal to the magnitude of a power output to the transmission line 120 is consumed in the resistor R1 of the hybrid circuit 110.

The description given above has explained the configuration of the hybrid circuit 110 configured to include the signal transmitting buffer 111, which has an ideal voltage output, the amplifier 112 as well as the resistors R2 and R3 and explained the configuration of the full duplex transmission circuit making use of the hybrid circuit 110.

Second Example of Typical Ordinary Full Duplex Transmission Circuit #2

Figure 10:
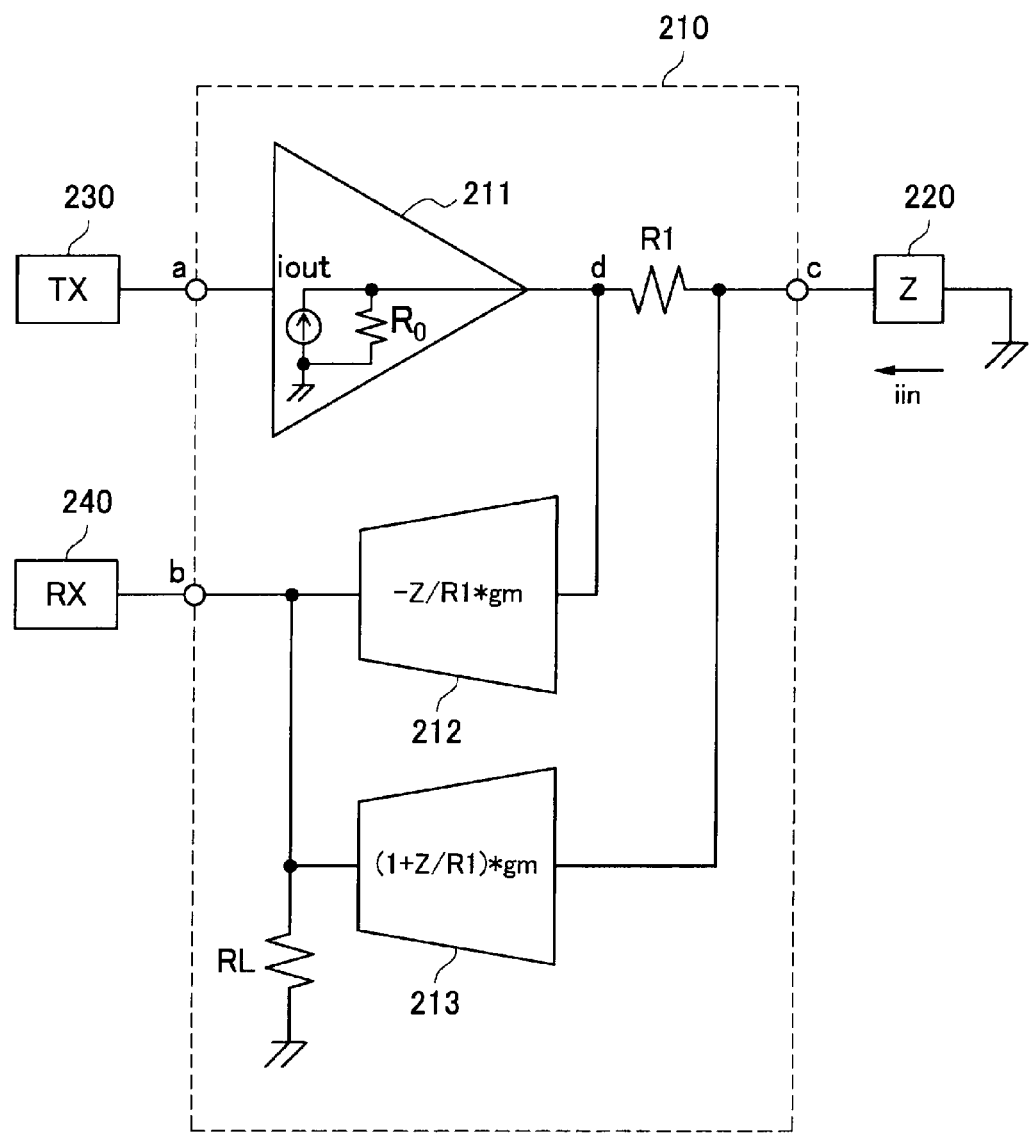
FIG. 10 is an explanatory diagram showing another typical full duplex transmission circuit making use of an ordinary hybrid circuit configured to include resistors and operational amplifiers.

In recent years, differential data transmissions are widely used as transmissions having high speeds exceeding several Gbps. In the case of such an application, a full duplex transmission circuit shown in FIG. 10 is used. As shown in the figure, this full duplex transmission circuit employs a hybrid circuit 210, a signal transmitting section 230, a signal receiving section 240 and a transmission line 220. The hybrid circuit 210 includes a signal transmitting buffer 211 and a signal receiving buffer including a combination of amplifiers 212 and 213 having transconductances $g_m$ different from each other. The signal transmitting buffer 211 includes a combination of a current source for generating a current according to a signal to be transmitted and an embedded resistor R0. In order to assure matching of the impedances of the hybrid circuit 210 and the transmission line 220, it is necessary to adjust the resistances of the resistor R0 embedded in the signal transmitting buffer 211 and the resistor R1 of the hybrid circuit 210 so as to satisfy the equation R0+R1=Z. In the following description, for the sake of simplicity, the equations R0=R1=Z/2 are assumed to hold true.

The signal transmitting buffer 211 generates a current output iout according to a transmitted signal a received from the signal transmitting section 230. This current output results in voltages d and c as follows: d=3/8*iout*Z and c=2/8*iout*Z. At that time, electric powers consumed in the resistors R0, R1 and Z are 9/32*iout*iout*Z, 1/32*iout*iout*Z and 2/32*iout*iout*Z respectively. That is to say, an electric power consumed in the load resistor R0 of the signal transmitting buffer 211 is 4.5 times an electric power transmitted to the transmission line 220 whereas an electric power consumed in the resistor R1 of the hybrid circuit 210 is 0.5 times the electric power transmitted to the transmission line 220.

It is to be noted that, if the transconductances of the two amplifiers 212 and 213 are set at −2*gm and 3*gm respectively, the output of the signal transmitting buffer 211 is canceled by the outputs of the amplifiers 212 and 213 so that it is possible to prevent data from sneaking around from the signal transmitting section 230 to the signal receiving section 240.

A received current iin coming from the transmission line 220 results in voltages c and d as follows: c=iin*Z and d=1/2*iin*Z. At that time, electric powers consumed in the resistors R0 and R1 are 1/2*iin*iin*Z and 1/2*iin*iin*Z respectively. Voltages generated at c and d are supplied to the amplifiers 213 and 212 respectively. Thus, a received signal obtained at b has a magnitude expressed as follows: b=RL*(3*gm*iin*Z−2*gm*1/2*iin*Z)=RL*2*gm*iin*Z. In this case, the amplifier 212 operates as an inverting amplifier for the received signal. Thus, the amplifier 212 operates to reduce the gain of the amplifier 213. That is to say, in a signal receiving operation, the amplifier 212 reduces the total gain while consuming electric power.

The description given above has briefly explained the configurations of the full duplex transmission circuits applied to differential data transmissions carried out at high speeds.

Figure 11:
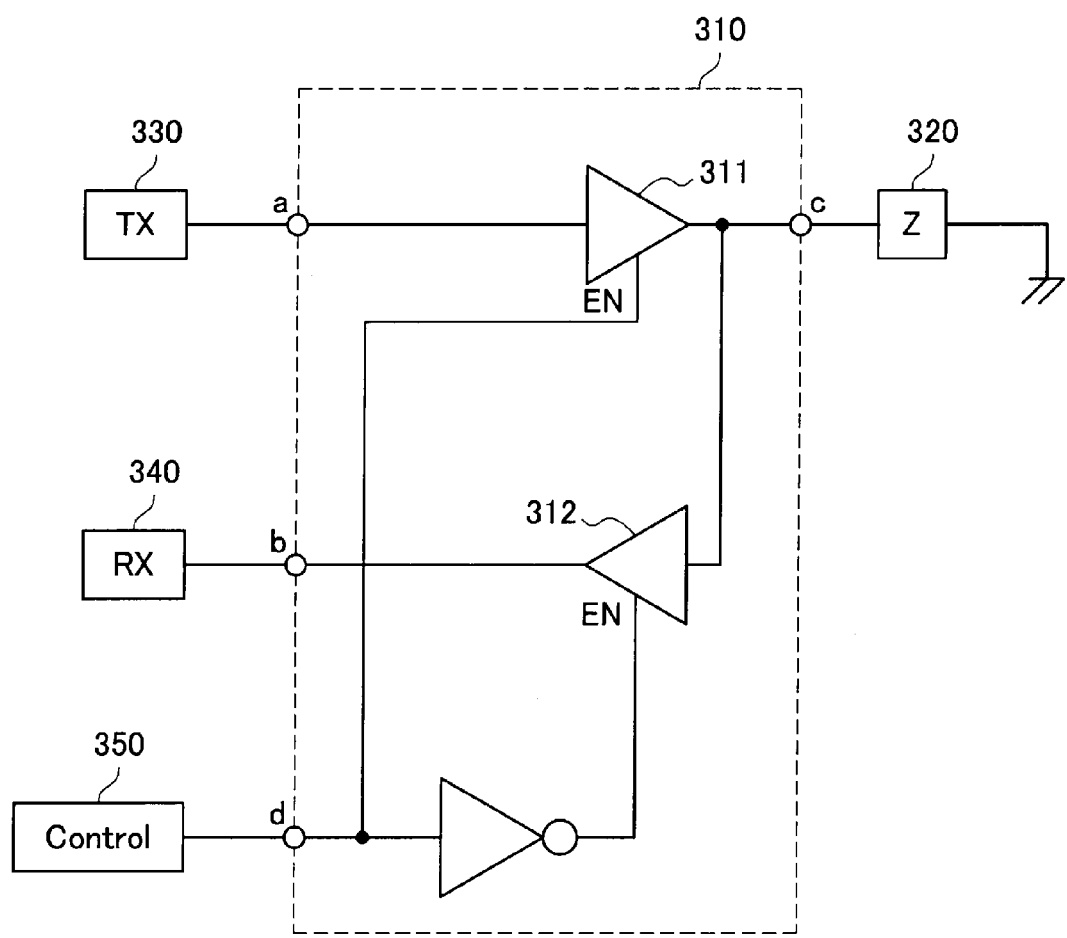
FIG. 11 is an explanatory diagram showing a typical apparatus implementing ordinary half full duplex transmissions.

As described above, in the full duplex transmission apparatus (or the full duplex transmission circuit) employing a hybrid circuit configured to include resistors and amplifiers, a resistor R1 is inserted in series with the transmission line into a location between the output terminal of the signal transmitting buffer and the output terminal of the hybrid circuit. Thus, in an effort to increase the transmission speed, the resistor R1 undesirably decreases the output efficiency of the signal transmitting buffer connected to a resistive load of the transmission line. In addition, in the case of the full duplex transmission apparatus having a configuration in which the signal receiving buffer is implemented as a combination of two amplifiers with transconductances $g_m$ thereof different from each other, there is an undesirable side effect that one of the two amplifiers reduces the gain of a received signal while consuming electric power. On top of that, it is a matter of course that, in either of the full duplex transmission apparatus (or the full duplex transmission circuits), both the signal transmitting buffer and the signal receiving buffer always operate at full duplex transmission times so that both the signal transmitting buffer and the signal receiving buffer consume electric power. Thus, such full duplex transmission circuits have a large power consumption in comparison with a half full duplex transmission circuit like one shown in FIG. 11 to serve as a half full duplex transmission circuit for carrying out signal transmissions in two directions on a time-division basis.

As described above, the ordinary full duplex transmission circuit raises a problem of a large power consumption. In order to solve this problem, inventors of the disclosure have devised a full duplex transmission circuit capable of operating at a high speed and at a small power consumption.

2: Embodiments

Embodiments of the present disclosure are explained as follows.

2-1: Configurations of Full Duplex Transmission Circuits

Explanation of Principles

The configurations of full duplex transmission circuits according to embodiments are explained as follows.

2-1-1: First Configuration

Basic Configuration Using MOS Transistors

First of all, a basic configuration making use of MOS transistors is explained by referring to FIG. 1. As shown in the figure, in the basic configuration making use of MOS transistors, the full duplex transmission circuit is configured to employ MOS transistors in accordance with an embodiment. In the following description, the circuit configuration shown in FIG. 1 is referred to as a first configuration in some cases. It is to be noted that the technical term 'MOS' used in this specification of the present disclosure stands for a metal oxide semiconductor.

As shown in FIG. 1, the full duplex transmission circuit having the first configuration is configured to employ a current source 10, MOS transistors 11a and 12a, internal input terminals TX0 and TX1, an internal output terminal RX as well as an external input/output terminal IO. In addition, the external input/output terminal IO is connected to a transmission line 13 having a characteristic impedance Z.

The source of the MOS transistor 11a is connected to the current source 10 and the external input/output terminal IO whereas the gate of the MOS transistor 11a is connected to the internal input terminal TX0. On the other hand, the drain of the MOS transistor 11a is connected to the source of the MOS transistor 12a and the internal output terminal RX. That is to say, the source of the MOS transistor 12a is connected to the drain of the MOS transistor 11a and the internal output terminal RX. In addition, the gate of the MOS transistor 12a is connected to the internal input terminal TX1.

It is to be noted that the internal input terminal TX0 receives a signal to be transmitted. In the following description, the signal to be transmitted is also referred to as a transmitted signal. In addition, the internal input terminal TX1 receives a signal having the same phase as the transmitted signal supplied to the internal input terminal TX0 and an amplitude equal to ½ times the amplitude of the signal to be transmitted. In the following description, the signal supplied to the internal input terminal TX1 is referred to as a cancel signal.

In addition, a current $I_B$ generated by the current source 10 and the size of the MOS transistor 11a are set so that the transconductance $g_m$ of the MOS transistor 11a is equal to 1/Z. By setting the current $I_B$ and the size of the MOS transistor 11a in this way, it is possible to implement matching of the impedances of the external input/output terminal IO and the transmission line 13. In addition, the size of the MOS transistor 12a is set so that the transconductance $g_m$ of the MOS transistor 12a is equal to the transconductance $g_m$ of the MOS transistor 11a.

When the signal to be transmitted is supplied to the internal input terminal TX0, the signal to be transmitted is amplified by the MOS transistor 11a without being inverted and output from the source of the MOS transistor 11a to the external input/output terminal IO. In addition, this signal to be transmitted is amplified and inverted by the MOS transistor 11a, being output from the drain of the MOS transistor 11a to the internal output terminal RX. On the other hand, when the cancel signal is supplied to the internal input terminal TX1, the cancel signal is amplified by the MOS transistor 12a without being inverted and output from the source of the MOS transistor 12a to the internal output terminal RX. The cancel signal amplified by the MOS transistor 12a without being inverted and output from the source of the MOS transistor 12a to the internal output terminal RX cancels the transmitted signal amplified and inverted by the MOS transistor 11a and output from the drain of the MOS transistor 11a to the internal output terminal RX. It is thus possible to prevent a current from flowing out to the internal output terminal RX.

On the other hand, a received signal coming from the external input/output terminal IO is terminated by the source resistance Z of the MOS transistor 11a having a grounded base. This received signal is amplified by the MOS transistor 11a without being inverted and output from the drain of the MOS transistor 11a to the internal output terminal RX.

In this way, on a current path through which a current is flowing from a power supply to the ground, with respect to the received signal coming from the external input/output terminal IO, the MOS transistor 11a functions as an amplification circuit with the gate thereof connected to the ground at the first stage for the received signal. In addition, with respect to the transmitted signal coming from the internal input terminal TX0, the MOS transistor 11a functions as a source follower amplification circuit provided at the last stage as an amplification circuit for outputting the signal to the external input/output terminal IO.

On the other hand, the MOS transistor 12a functions as a source follower amplification circuit for cancelling a signal sneaking around from the internal input terminal TX0 to the internal output terminal RX.

The above description has explained the MOS-transistor-based basic configuration serving as the first configuration of the full duplex transmission circuit making use of MOS transistors in accordance with an embodiment.

2-1-2: Second Configuration

Basic Configuration Using Bipolar Transistors

Next, a basic configuration making use of bipolar transistors is explained by referring to FIG. 2. As shown in the figure, in the basic configuration making use of bipolar transistors, the full duplex transmission circuit is configured to employ bipolar transistors in accordance with an embodiment. In the following description, the circuit configuration shown in FIG. 2 is referred to as a second configuration in some cases.

As shown in FIG. 2, the full duplex transmission circuit having the second configuration is configured to employ a current source 10, bipolar transistors 11b and 12b, internal input terminals TX0 and TX1, an internal output terminal RX as well as an external input/output terminal IO. In addition, the external input/output terminal IO is connected to a transmission line 13 having a characteristic impedance Z.

The emitter of the bipolar transistor 11b is connected to the current source 10 and the external input/output terminal IO whereas the base of the bipolar transistor 11b is connected to the internal input terminal TX0. On the other hand, the collector of the bipolar transistor 11b is connected to the emitter of the bipolar transistor 12b and the internal output terminal RX. That is to say, the emitter of the bipolar transistor 12b is connected to the collector of the bipolar transistor 11b and the internal output terminal RX. In addition, the base of the bipolar transistor 12b is connected to the internal input terminal TX1.

It is to be noted that the internal input terminal TX0 receives a signal to be transmitted. In addition, the internal input terminal TX1 receives a signal having the same phase as the transmitted signal supplied to the internal input terminal TX0 and an amplitude equal to ½ times the amplitude of the signal to be transmitted. In the following description, the signal supplied to the internal input terminal TX1 is referred to as a cancel signal.

In addition, a current $I_{B0}$ generated by the current source 10 is set so that the emitter resistance $r_e$ of the bipolar transistor 11b is equal to Z. By setting the current $I_{B0}$ in this way, it is possible to implement matching of the impedances of the external input/output terminal IO and the transmission line 13.

When the signal to be transmitted is supplied to the internal input terminal TX0, the signal to be transmitted is amplified by the bipolar transistor 11b without being inverted and output from the emitter of the bipolar transistor 11b to the external input/output terminal IO. In addition, this signal to be transmitted is amplified and inverted by the bipolar transistor 11b, being output from the collector of the bipolar transistor 11b to the internal output terminal RX. On the other hand, when the cancel signal is supplied to the internal input terminal TX1, the cancel signal is amplified by the bipolar transistor 12b without being inverted and output from the emitter of the bipolar transistor 12b to the internal output terminal RX. The cancel signal amplified by the bipolar transistor 12b without being inverted and output from the emitter of the bipolar transistor 12b to the internal output terminal RX cancels the transmitted signal amplified and inverted by the bipolar transistor 11b and output from the collector of the bipolar transistor 11b to the internal output terminal RX. It is thus possible to prevent a current from flowing out to the internal output terminal RX.

On the other hand, a received signal coming from the external input/output terminal IO is terminated by emitter resistance Z of the bipolar transistor 11b having a grounded base. This received signal is amplified by the bipolar transistor 11b without being inverted and output from the collector of the bipolar transistor 11b to the internal output terminal RX.

In this way, on a current path through which a current is flowing from a power supply to the ground, with respect to the received signal coming from the external input/output terminal IO, the bipolar transistor 11b functions as an amplification circuit with the base thereof connected to the ground at the first stage for the received signal. In addition, with respect to the transmitted signal coming from the internal input terminal TX0, the bipolar transistor 11b functions as an emitter follower amplification circuit provided at the last stage as an amplification circuit for outputting the signal to the external input/output terminal IO. On the other hand, the bipolar transistor 12b functions as an emitter follower amplification circuit for cancelling a signal sneaking around from the internal input terminal TX0 to the internal output terminal RX.

The above description has explained the bipolar-transistor-based basic configuration serving as the second configuration of the full duplex transmission circuit making use of bipolar transistors in accordance with an embodiment.

2-1-3: Third Configuration

Differential Implementation of Basic Configuration Using MOS Transistors

Next, a differential-signal-based implementation of the basic configuration making use of MOS transistors is explained by referring to FIG. 3. As shown in the figure, in the differential-signal-based implementation of the basic configuration making use of MOS transistors, the full duplex transmission circuit is configured to employ MOS transistors in accordance with an embodiment. In the following description, the circuit configuration shown in FIG. 3 is referred to as a third configuration in some cases. It is to be noted that the third configuration is obtained by modifying the first configuration in order to allow applications to differential signal transmissions.

As shown in FIG. 3, the full duplex transmission circuit having the third configuration is configured to employ current sources 20 and 23, MOS transistors 21a, 22a, 24a and 25a, internal input terminals TX0, TX1, TX0X and TX1X, internal output terminals RX and RXX as well as external input/output terminals IO and IOX. In addition, the external input/output terminals IO and IOX are connected to respectively transmission lines 26 and 27 each having a characteristic impedance Z.

The source of the MOS transistor 21a is connected to the current source 20 and the external input/output terminal IO whereas the gate of the MOS transistor 21a is connected to the internal input terminal TX0. On the other hand, the drain of the MOS transistor 21a is connected to the source of the MOS transistor 22a and the internal output terminal RX. That is to say, the source of the MOS transistor 22a is connected to the drain of the MOS transistor 21a and the internal output terminal RX. In addition, the gate of the MOS transistor 22a is connected to the internal input terminal TX1.

On top of that, the source of the MOS transistor 24a is connected to the current source 23 and the external input/output terminal IOX whereas the gate of the MOS transistor 24a is connected to the internal input terminal TX0X. On the other hand, the drain of the MOS transistor 24a is connected to the source of the MOS transistor 25a and the internal output terminal RXX. That is to say, the source of the MOS transistor 25a is connected to the drain of the MOS transistor 24a and the internal output terminal RXX. In addition, the gate of the MOS transistor 25a is connected to the internal input terminal TX1X.

It is to be noted that the internal input terminal TX0 receives a first differential signal. In addition, the internal input terminal TX1 receives a signal having the same phase as the first differential signal supplied to the internal input terminal TX0 and an amplitude equal to ½ times the amplitude of the first differential signal. In the following description, the signal supplied to the internal input terminal TX1 is referred to as a cancel signal. By the same token, the internal input terminal TX0X receives a second differential signal forming a signal pair in conjunction with the first differential signal. In addition, the internal input terminal TX1X receives a signal having the same phase as the second differential signal supplied to the internal input terminal TX0X and an amplitude equal to ½ times the amplitude of the second differential signal. In the following description, the signal supplied to the internal input terminal TX1X is also referred to as a cancel signal.

In addition, currents $I_B$ generated by the current sources 20 and 23 as well as the sizes of the MOS transistors 21*a* and 24*a* are set so that the transconductances $g_m$ of the MOS transistors 21*a* and 24*a* are equal to 1/Z. In addition, the sizes of the MOS transistors 22*a* and 25*a* are set so that the transconductances $g_m$ of the MOS transistors 22*a* and 25*a* are equal to the transconductances $g_m$ of the MOS transistors 21*a* and 24*a*.

The above description has explained the MOS-transistor-based differential configuration serving as the third configuration of the full duplex transmission circuit making use of MOS transistors in accordance with an embodiment.

2-1-4: Fourth Configuration

Differential Implementation of Basic Configuration Using Bipolar Transistors

Next, a differential-signal-based implementation of the basic configuration making use of bipolar transistors is explained by referring to FIG. 4. As shown in the figure, in the differential-signal-based implementation of the basic configuration making use of bipolar transistors, the full duplex transmission circuit is configured to employ bipolar transistors in accordance with an embodiment. In the following description, the circuit configuration shown in FIG. 4 is referred to as a fourth configuration in some cases. It is to be noted that the fourth configuration is obtained by modifying the second configuration in order to allow applications to differential signal transmissions.

As shown in FIG. 4, the full duplex transmission circuit having the fourth configuration is configured to employ current sources 20 and 23, bipolar transistors 21*b*, 22*b*, 24*b* and 25*b*, internal input terminals TX0, TX1, TX0X and TX1X, internal output terminals RX and RXX as well as external input/output terminals IO and IOX. In addition, the external input/output terminals IO and IOX are connected to respectively transmission lines 26 and 27 each having a characteristic impedance Z.

The emitter of the bipolar transistor 21*b* is connected to the current source 20 and the external input/output terminal IO whereas the base of the bipolar transistor 21*b* is connected to the internal input terminal TX0. On the other hand, the collector of the bipolar transistor 21*b* is connected to the emitter of the bipolar transistor 22*b* and the internal output terminal RX. Also, the emitter of the bipolar transistor 22*b* is connected to the collector of the bipolar transistor 21*b* and the internal output terminal RX. In addition, the base of the bipolar transistor 22*b* is connected to the internal input terminal TX1.

On top of that, the emitter of the bipolar transistor 24*b* is connected to the current source 23 and the external input/output terminal IOX whereas the base of the bipolar transistor 24*b* is connected to the internal input terminal TX0X. On the other hand, the collector of the bipolar transistor 24*b* is connected to the emitter of the bipolar transistor 25*b* and the internal output terminal RXX. That is to say, the emitter of the bipolar transistor 25*b* is connected to the collector of the bipolar transistor 24*b* and the internal output terminal RXX. In addition, the base of the bipolar transistor 25*b* is connected to the internal input terminal TX1X.

It is to be noted that the internal input terminal TX0 receives a first differential signal. In addition, the internal input terminal TX1 receives a signal having the same phase as the first differential signal supplied to the internal input terminal TX0 and an amplitude equal to ½ times the amplitude of the first differential signal. In the following description, the signal supplied to the internal input terminal TX1 is referred to as a cancel signal. By the same token, the internal input terminal TX0X receives a second differential signal forming a signal pair in conjunction with the first differential signal. In addition, the internal input terminal TX1X receives a signal having the same phase as the second differential signal supplied to the internal input terminal TX0X and an amplitude equal to ½ times the amplitude of the second differential signal. In the following description, the signal supplied to the internal input terminal TX1X is also referred to as a cancel signal.

In addition, a current $I_{B0}$ generated by the current source 20 is set so that the emitter resistance $r_e$ of the bipolar transistor 21*b* is equal to Z. By the same token, a current $I_{B0}$ generated by the current source 23 is set so that the emitter resistance $r_e$ of the bipolar transistor 24*b* is equal to Z. By setting the current $I_{B0}$ generated by the current source 20 in this way, it is possible to implement matching of the impedances of the external input/output terminal 10 and the transmission line 26. By the same token, by setting the current $I_{B0}$ generated by the current source 23 in this way, it is possible to implement matching of the impedances of the external input/output terminal 10× and the transmission line 27.

The above description has explained the bipolar-transistor-based differential configuration serving as the fourth configuration of the full duplex transmission circuit making use of bipolar transistors in accordance with an embodiment.

2-1-5: Fifth Configuration

Typical Modification Using MOS Transistors

Next, a typical modification making use of MOS transistors in accordance with an embodiment is explained by referring to FIG. 5. As shown in the figure, in the typical modification making use of MOS transistors, the full duplex transmission circuit is configured to employ MOS transistors in accordance with an embodiment. In the following description, the circuit configuration shown in FIG. 5 is referred to as a fifth configuration in some cases.

As shown in FIG. 5, the full duplex transmission circuit having the fifth configuration is configured to employ current sources 30 and 33, MOS transistors 31*a* and 32*a*, internal input terminals TX0 and TX1, an internal output terminal RX as well as an external input/output terminal IO. In addition, the external input/output terminal IO is connected to a transmission line 34 having a characteristic impedance Z.

The source of the MOS transistor 31*a* is connected to the current source 30 and the external input/output terminal IO whereas the gate of the MOS transistor 31*a* is connected to the internal input terminal TX0. On the other hand, the drain of the MOS transistor 31*a* is connected to the source of the MOS transistor 32*a*, the current source 33 and the internal output terminal RX. That is to say, the source of the MOS transistor 32*a* is connected to the drain of the MOS transistor 31*a*, the current source 33 and the internal output terminal RX. In addition, the gate of the MOS transistor 32*a* is connected to the internal input terminal TX1.

It is to be noted that the internal input terminal TX0 receives a signal to be transmitted. In addition, the internal input terminal TX1 receives a signal having the same phase as the transmitted signal supplied to the internal input terminal TX0, a bias point different from the bias point of the signal to be transmitted and an amplitude equal to G/2 times the amplitude of the signal to be transmitted. In the following description, the signal supplied to the internal input terminal TX1 is referred to as a cancel signal.

In addition, a current $I_{B0}$ generated by the current source 30 and the size of the MOS transistor 31a are set so that the transconductance $g_{m0}$ of the MOS transistor 31a is equal to 1/Z. By setting the current $I_{B0}$ and the size of the MOS transistor 31a in this way, it is possible to implement matching of the impedances of the external input/output terminal IO and the transmission line 34. By the same token, a current $I_{B1}$ generated by the current source 33 and the size of the MOS transistor 32a are set so that the transconductance $g_{m1}$ of the MOS transistor 32a is equal to 1/G times the transconductance $g_{m0}$ of the MOS transistor 31a where G is a number approximately satisfying the relations 1<G<4.

When the signal to be transmitted is supplied to the internal input terminal TX0, the signal to be transmitted is amplified by the MOS transistor 31a without being inverted and output from the source of the MOS transistor 31a to the external input/output terminal IO. In addition, this signal to be transmitted is amplified and inverted by the MOS transistor 31a, being output from the drain of the MOS transistor 31a to the internal output terminal RX. On the other hand, when the cancel signal is supplied to the internal input terminal TX1, the cancel signal is amplified by the MOS transistor 32a without being inverted and output from the source of the MOS transistor 32a to the internal output terminal RX. The cancel signal amplified by the MOS transistor 32a without being inverted and output from the source of the MOS transistor 32a to the internal output terminal RX cancels the transmitted signal amplified and inverted by the MOS transistor 31a and output from the drain of the MOS transistor 31a to the internal output terminal RX. It is thus possible to prevent a current from flowing out to the internal output terminal RX.

On the other hand, a received signal coming from the external input/output terminal IO is terminated by the source resistance Z of the MOS transistor 31a having a grounded base. This received signal is amplified by the MOS transistor 31a without being inverted and output from the drain of the MOS transistor 31a to the internal output terminal RX.

The above description has explained a typical MOS-transistor-based modification serving as the fifth configuration of the full duplex transmission circuit making use of MOS transistors in accordance with an embodiment.

2-1-6: Sixth Configuration

Typical Modification Using Bipolar Transistors

Figure 6:
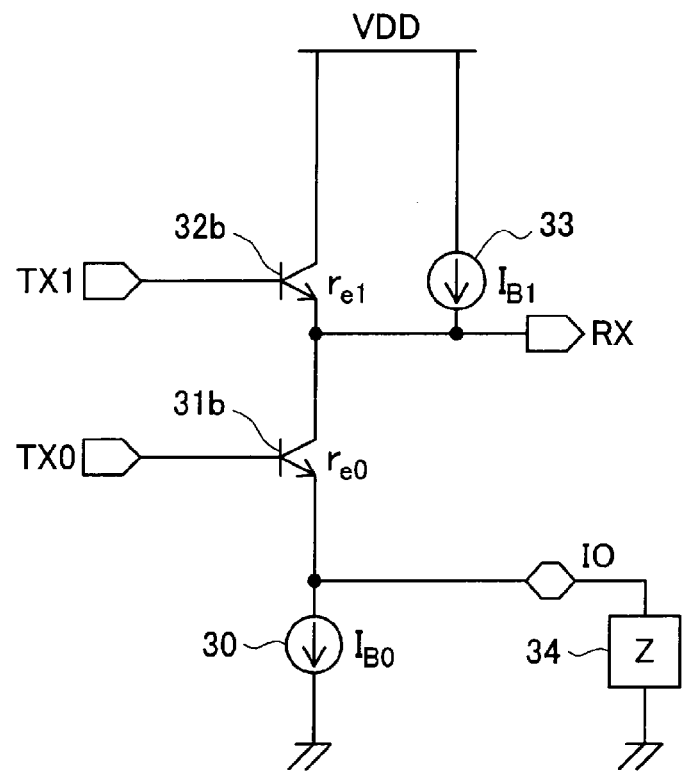
FIG. 6 is an explanatory diagram showing the circuit configuration of a typical modification of a full duplex transmission circuit employing bipolar transistors in accordance with the same embodiment.

Next, a typical modification making use of bipolar transistors is explained by referring to FIG. 6. As shown in the figure, in the typical modification making use of bipolar transistors, the full duplex transmission circuit is configured to employ bipolar transistors in accordance with an embodiment. In the following description, the circuit configuration shown in FIG. 6 is referred to as a sixth configuration in some cases.

As shown in FIG. 6, the full duplex transmission circuit having the sixth configuration is configured to employ current sources 30 and 33, bipolar transistors 31b and 32b, internal input terminals TX0 and TX1, an internal output terminal RX as well as an external input/output terminal IO. In addition, the external input/output terminal IO is connected to a transmission line 34 having a characteristic impedance Z.

The emitter of the bipolar transistor 31b is connected to the current source 30 and the external input/output terminal IO whereas the base of the bipolar transistor 31b is connected to the internal input terminal TX0. On the other hand, the collector of the bipolar transistor 31b is connected to the emitter of the bipolar transistor 32b, the current source 33 and the internal output terminal RX. That is to say, the emitter of the bipolar transistor 32b is connected to the collector of the bipolar transistor 31b, the current source 33 and the internal output terminal RX. In addition, the base of the bipolar transistor 32b is connected to the internal input terminal TX1.

It is to be noted that the internal input terminal TX0 receives a signal to be transmitted. In addition, the internal input terminal TX1 receives a signal having the same phase as the transmitted signal supplied to the internal input terminal TX0 and an amplitude equal to G/2 times the amplitude of the signal to be transmitted. In the following description, the signal supplied to the internal input terminal TX1 is referred to as a cancel signal.

In addition, a current $I_{B0}$ generated by the current source 30 is set so that the emitter resistance $r_{e0}$ of the bipolar transistor 31b is equal to Z. By setting the current $I_{B0}$ in this way, it is possible to implement matching of the impedances of the external input/output terminal IO and the transmission line 34. On top of that, a current $I_{B1}$ generated by the current source 33 is set so that the emitter resistance $r_{e1}$ of the bipolar transistor 32b is equal to G times the emitter resistance $r_{e0}$ of the bipolar transistor 31b where G is a number approximately satisfying the relations 1<G<4.

When the signal to be transmitted is supplied to the internal input terminal TX0, the signal to be transmitted is amplified by the bipolar transistor 31b without being inverted and output from the emitter of the bipolar transistor 31b to the external input/output terminal IO. In addition, this signal to be transmitted is amplified and inverted by the bipolar transistor 31b, being output from the collector of the bipolar transistor 31b to the internal output terminal RX. Also, when the cancel signal is supplied to the internal input terminal TX1, the cancel signal is amplified by the bipolar transistor 32b without being inverted and output from the emitter of the bipolar transistor 32b to the internal output terminal RX. The cancel signal amplified by the bipolar transistor 32b without being inverted and output from the emitter of the bipolar transistor 32b to the internal output terminal RX cancels the transmitted signal amplified and inverted by the bipolar transistor 31b and output from the collector of the bipolar transistor 31b to the internal output terminal RX. It is thus possible to prevent a current from flowing out to the internal output terminal RX.

On the other hand, a received signal coming from the external input/output terminal IO is terminated by emitter resistance Z of the bipolar transistor 31b having a grounded base. This received signal is amplified by the bipolar transistor 31b without being inverted and output from the collector of the bipolar transistor 31b to the internal output terminal RX.

The above description has explained a typical bipolar-transistor-based modification serving as the sixth configuration of the full duplex transmission circuit making use of bipolar transistors in accordance with an embodiment.

2-1-7: Seventh Configuration

Differential Configuration of Typical Modification Using MOS Transistors

Figure 7:
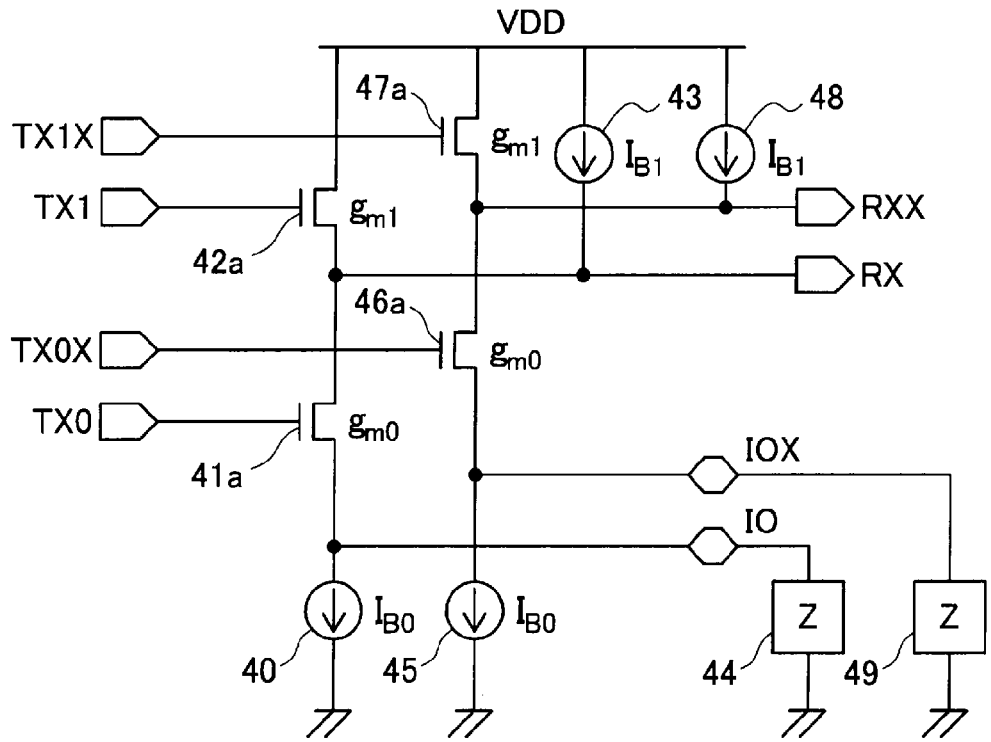
FIG. 7 is an explanatory diagram showing a typical circuit configuration of a typical modification of a full duplex transmission circuit employing MOS transistors to implement a differential transmission method in accordance with an embodiment of the present disclosure.

Next, a differential configuration of the typical modification making use of MOS transistors is explained by referring to FIG. 7. As shown in the figure, in the differential configuration of the typical modification making use of MOS transistors, the full duplex transmission circuit is configured to employ MOS transistors in accordance with an embodiment.

In the following description, the circuit configuration shown in FIG. 7 is referred to as a seventh configuration in some cases. It is to be noted that the seventh configuration is obtained by modifying the fifth configuration in order to allow applications to differential signal transmissions.

As shown in FIG. 7, the full duplex transmission circuit having the seventh configuration is configured to employ current sources 40, 43, 45 and 48, MOS transistors 41a, 42a, 46a and 47a, internal input terminals TX0, TX1, TX0X and TX1X, internal output terminals RX and RXX as well as external input/output terminals IO and IOX. In addition, the external input/output terminals IO and IOX are connected to respectively transmission lines 44 and 49 each having a characteristic impedance Z.

The source of the MOS transistor 41a is connected to the current source 40 and the external input/output terminal IO whereas the gate of the MOS transistor 41a is connected to the internal input terminal TX0. On the other hand, the drain of the MOS transistor 41a is connected to the source of the MOS transistor 42a, the current source 43 and the internal output terminal RX. That is to say, the source of the MOS transistor 42a is connected to the drain of the MOS transistor 41a, the current source 43 and the internal output terminal RX. In addition, the gate of the MOS transistor 42a is connected to the internal input terminal TX1.

On top of that, the source of the MOS transistor 46a is connected to the current source 45 and the external input/output terminal IOX whereas the gate of the MOS transistor 46a is connected to the internal input terminal TX0X. On the other hand, the drain of the MOS transistor 46a is connected to the source of the MOS transistor 47a, the current source 48 and the internal output terminal RXX. That is to say, the source of the MOS transistor 47a is connected to the drain of the MOS transistor 46a, the current source 48 and the internal output terminal RXX. In addition, the gate of the MOS transistor 47a is connected to the internal input terminal TX1X.

It is to be noted that the internal input terminal TX0 receives a first differential signal. In addition, the internal input terminal TX1 receives a signal having the same phase as the first differential signal supplied to the internal input terminal TX0 and an amplitude equal to G/2 times the amplitude of the first differential signal. In the following description, the signal supplied to the internal input terminal TX1 is referred to as a cancel signal. By the same token, the internal input terminal TX0X receives a second differential signal forming a signal pair in conjunction with the first differential signal. In addition, the internal input terminal TX1X receives a signal having the same phase as the second differential signal supplied to the internal input terminal TX0X and an amplitude equal to G/2 times the amplitude of the second differential signal. In the following description, the signal supplied to the internal input terminal TX1X is also referred to as a cancel signal.

In addition, currents $I_{B0}$ generated by the current sources 40 and 45 as well as the sizes of the MOS transistors 41a and 46a are set so that the transconductances $g_{m0}$ of the MOS transistors 41a and 46a are equal to 1/Z. By setting the currents $I_{B0}$ and the sizes of the MOS transistors 41a and 46a in this way, it is possible to implement matching of the impedances of the external input/output terminal IO and the transmission line 44 as well as matching of the impedances of the external input/output terminal 10× and the transmission line 49. In addition, currents $I_{B1}$ generated by the current sources 43 and 48 as well as the sizes of the MOS transistors 42a and 47a are set so that the transconductances $g_{m1}$ of the MOS transistors 42a and 47a are equal to 1/G times the transconductances $g_{m0}$ of the MOS transistors 41a and 46a where G is a number approximately satisfying the relations 1<G<4.

The above description has explained the typical modification having the MOS-transistor-based differential configuration to serve as the seventh configuration of the full duplex transmission circuit making use of MOS transistors in accordance with an embodiment.

2-1-8: Eighth Configuration

Differential Configuration of Typical Modification Using Bipolar Transistors

Figure 8:
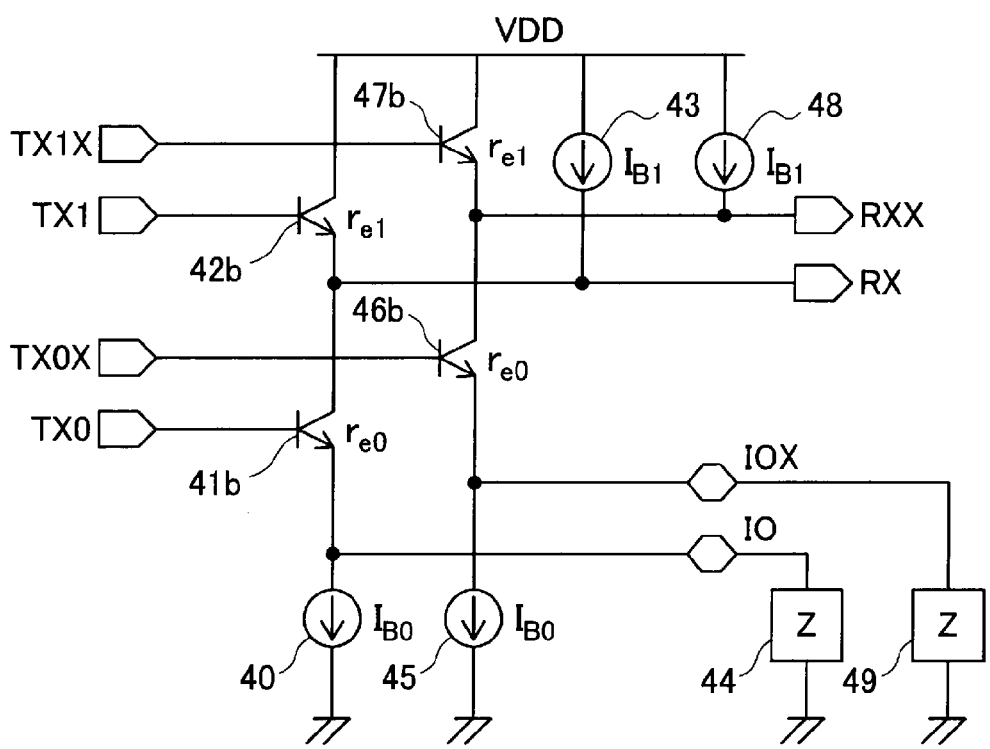
FIG. 8 is an explanatory diagram showing a typical circuit configuration of a typical modification of a full duplex transmission circuit employing bipolar transistors to implement the differential transmission method in accordance with the same embodiment.

Next, a differential configuration of the typical modification making use of bipolar transistors is explained by referring to FIG. 8. As shown in the figure, in the differential configuration of the typical modification making use of bipolar transistors, the full duplex transmission circuit is configured to employ bipolar transistors in accordance with an embodiment. In the following description, the circuit configuration shown in FIG. 8 is referred to as an eighth configuration in some cases. It is to be noted that the eighth configuration is obtained by modifying the sixth configuration in order to allow applications to differential signal transmissions.

As shown in FIG. 8, the full duplex transmission circuit having the eighth configuration is configured to employ current sources 40, 43, 45 and 48, bipolar transistors 41b, 42b, 46b and 47b, internal input terminals TX0, TX1, TX0X and TX1X, internal output terminals RX and RXX as well as external input/output terminals IO and IOX. In addition, the external input/output terminals IO and IOX are connected to respectively transmission lines 44 and 49 each having a characteristic impedance Z.

The emitter of the bipolar transistor 41b is connected to the current source 40 and the external input/output terminal IO whereas the base of the bipolar transistor 41b is connected to the internal input terminal TX0. On the other hand, the collector of the bipolar transistor 41b is connected to the emitter of the bipolar transistor 42b, the current source 43 and the internal output terminal RX. That is to say, the emitter of the bipolar transistor 42b is connected to the collector of the bipolar transistor 41b, the current source 43 and the internal output terminal RX. In addition, the base of the bipolar transistor 42b is connected to the internal input terminal TX1.

On top of that, the emitter of the bipolar transistor 46b is connected to the current source 45 and the external input/output terminal IOX whereas the base of the bipolar transistor 46b is connected to the internal input terminal TX0X. Further, the collector of the bipolar transistor 46b is connected to the emitter of the bipolar transistor 47b, the current source 48 and the internal output terminal RXX. That is to say, the emitter of the bipolar transistor 47b is connected to the collector of the bipolar transistor 46b, the current source 48 and the internal output terminal RXX. In addition, the base of the bipolar transistor 47b is connected to the internal input terminal TX1X.

It is to be noted that the internal input terminal TX0 receives a first differential signal. In addition, the internal input terminal TX1 receives a signal having the same phase as the first differential signal supplied to the internal input terminal TX0 and an amplitude equal to G/2 times the amplitude of the first differential signal. In the following description, the signal supplied to the internal input terminal TX1 is referred to as a cancel signal. By the same token, the internal input terminal TX0X receives a second differential signal forming a signal pair in conjunction with the first differential signal. In addition, the internal input terminal TX1X receives a signal having the same phase as the second differential signal supplied to the internal input terminal TX0X and an amplitude equal to G/2 times the amplitude of the second differential signal. In the following description, the signal supplied to the internal input terminal TX1X is also referred to as a cancel signal.

In addition, a current $I_{B0}$ generated by the current source 40 is set so that the emitter resistance $r_{e0}$ of the bipolar transistor 41b is equal to Z. By the same token, a current $I_{B0}$ generated by the current source 45 is set so that the emitter resistance $r_{e0}$ of the bipolar transistor 46b is equal to Z. By setting the current $I_{B0}$ generated by the current source 40 in this way, it is possible to implement matching of the impedances of the external input/output terminal IO and the transmission line 44. By the same token, by setting the current $I_{B0}$ generated by the current source 45 in this way, it is possible to implement matching of the impedances of the external input/output terminal 10× and the transmission line 49. In addition, a current $I_{B1}$ generated by the current source 43 is set so that the emitter resistance $r_{e1}$ of the bipolar transistor 42b is equal to G times the emitter resistance $r_{e0}$ of the bipolar transistor 41b where G is a number approximately satisfying the relations 1<G<4. By the same token, a current $I_{B1}$ generated by the current source 48 is set so that the emitter resistance $r_{e1}$ of the bipolar transistor 47b is equal to G times the emitter resistance $r_{e0}$ of the bipolar transistor 46b.

The above description has explained the typical modification having the bipolar-transistor-based differential configuration to serve as the eighth configuration of the full duplex transmission circuit making use of bipolar transistors in accordance with an embodiment.

The descriptions given so far have enlightened the configurations of full duplex transmission circuits according to embodiments of the present disclosure.

In the configurations described above, a bias current flowing from a power supply to the ground is used for implementing all functions of a signal transmitting buffer, a signal receiving buffer and a hybrid circuit. Thus, at a power consumption about equivalent to that of a half full duplex transmission circuit, all duplex data transmissions can be realized.

In particular, as shown in FIGS. 5 to 8, in order to prevent a signal to be transmitted from sneaking around to the internal output terminal RX, an additional current source is provided in parallel to a transistor so as to allow the magnitude of a current flowing through the transistor to be adjusted. Then, by adjusting the magnitude of this current, the source resistance of the MOS transistor (or the emitter resistance of the bipolar transistor) can be set at a value greater than the characteristic impedance Z of the transmission line. In addition, since the voltage gain of a transimpedance amplifier can also be set at a value not smaller than 1, the voltage gain of the first-stage circuit of the signal receiving buffer can be raised. On top of that, differential-signal-based implementations can be constructed with ease as is obvious from FIG. 3, FIG. 4, FIG. 7 and FIG. 8.

2-2: Operations of Full Duplex Transmission Circuits

Next, operations carried out by the full duplex transmission circuits according to the embodiments described above are explained below. It is to be noted that, in this case, operations carried out by the full duplex transmission circuits are explained by describing operations of the first and fifth configurations as examples. Description of operations carried out by the other configurations is omitted.

2-2-1: Operations of First Configuration

Basic Configuration

Figure 12:
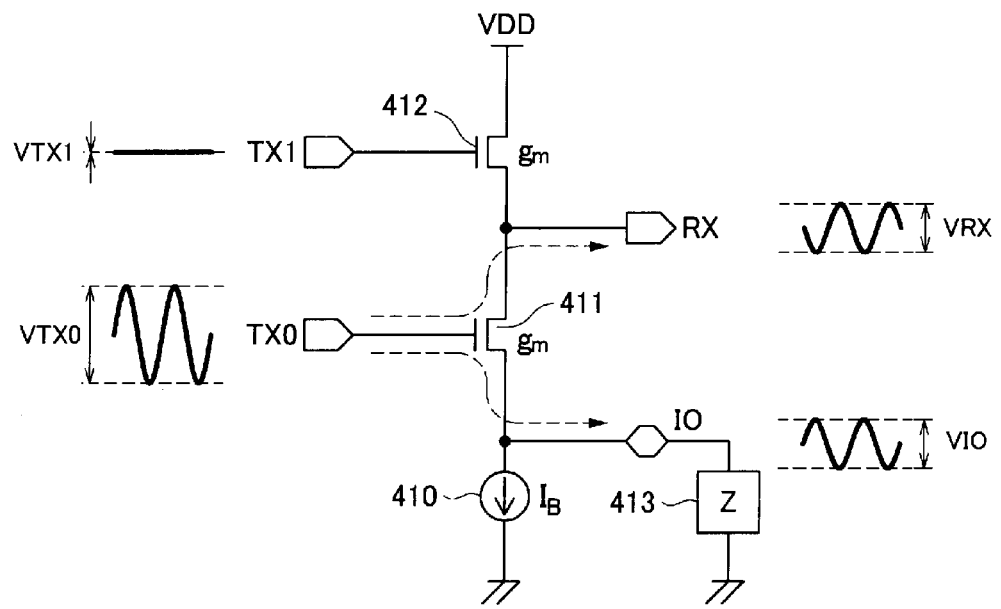
FIG. 12 is an explanatory diagram to be referred to in description of operations carried out by a full duplex transmission circuit employing MOS transistors in accordance with the same embodiment.
Figure 13:
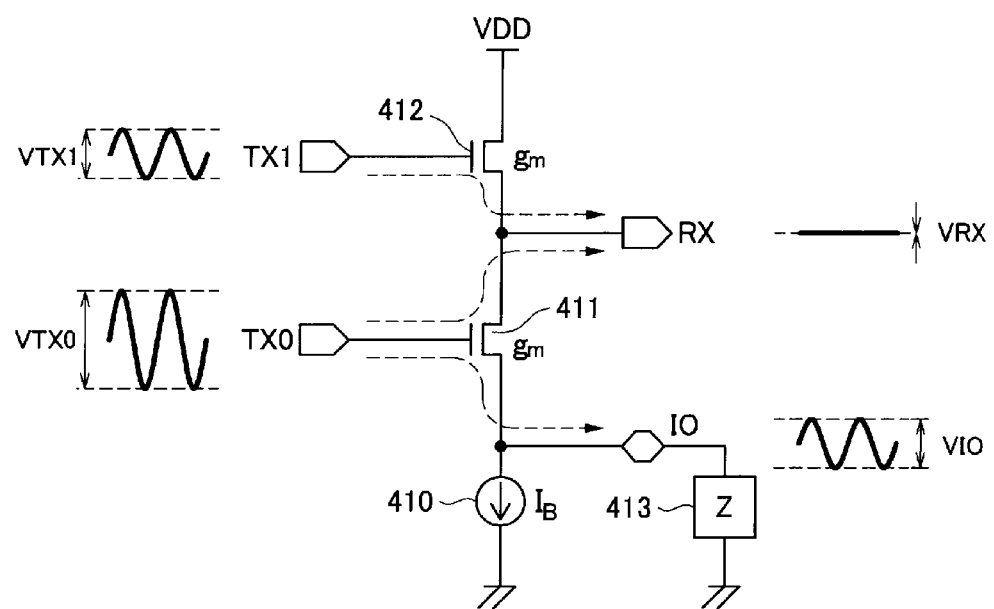
FIG. 13 is an explanatory diagram to be referred to in description of operations carried out by a full duplex transmission circuit employing MOS transistors in accordance with the same embodiment.
Figure 14:
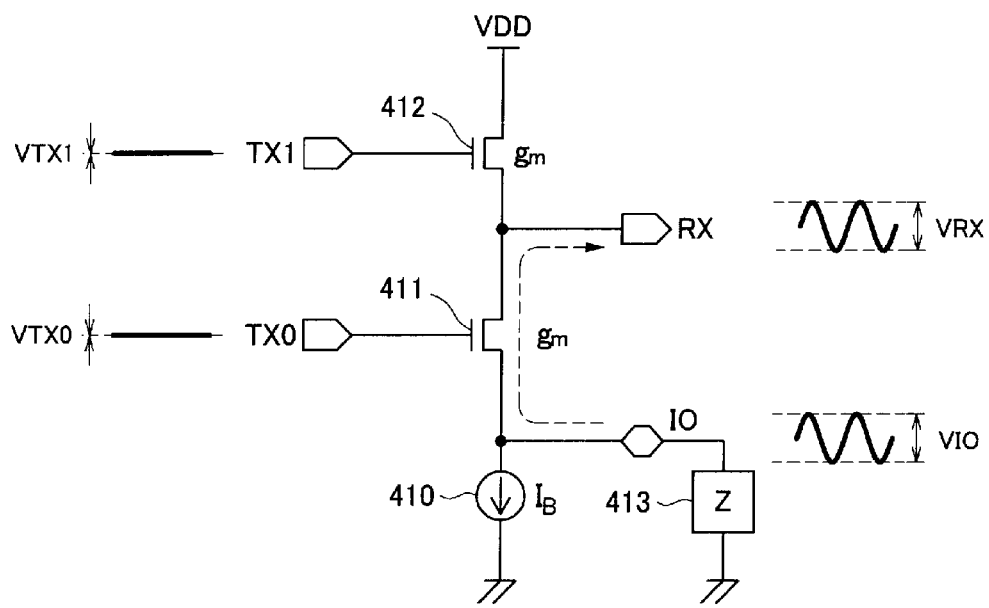
FIG. 14 is an explanatory diagram to be referred to in description of operations carried out by a full duplex transmission circuit employing MOS transistors in accordance with the same embodiment.

First of all, operations carried out by the full duplex transmission circuit having the first configuration are explained by referring to FIGS. 12 to 14. It is to be noted that, even though each reference numeral and each symbol which are used in FIGS. 12 to 14 may be different from those used in FIG. 1, the circuit configuration shown in FIGS. 12 to 14 is the same as the circuit configuration shown in FIG. 1.

The magnitude of a bias current $I_B$ generated by a current source 410 is set so that the transconductance $g_m$ of a MOS transistor 411 is equal to 1/Z. Thus, the source resistance of the MOS transistor 411 is equal to Z. On the other hand, the output impedance of the current source 410 is ideally infinite. As a result, an external input/output terminal IO can be put in a state of matching the characteristic impedance Z of a transmission line 413.

When a transmitted voltage signal VTX0 is supplied from an internal input terminal TX0 as shown in FIG. 12, the transmitted voltage signal VTX0 is applied to a series circuit including the MOS transistor 411 with a source resistance Z and the transmission line 413 with a characteristic impedance Z to appear at the external input/output terminal IO as a signal resulting from resistance-based voltage division, that is, amplification at a voltage gain of ½. That is to say, a voltage signal VIO having a magnitude of VIO (=VTX0/2) is output from the external input/output terminal IO. At that time, a voltage appearing between the gate and source electrodes of the MOS transistor 411 changes by the following quantity: VTX0−VIO=VTX0/2. Thus, the change of the voltage appearing between the gate and source electrodes of the MOS transistor 411 causes a current flowing through the drain of the MOS transistor 411 to change by gm*VTX0/2.

In addition, this change of the current flowing through the drain of the MOS transistor 411 by itself changes a current flowing through the source of a MOS transistor 412 and the change of the current flowing through the source of the MOS transistor 412 causes a voltage appearing between the gate and source electrodes of the MOS transistor 412 to change by the following quantity: VTX0/2 (=$g_m$*VTX0/2/$g_m$). If a voltage appearing at an internal input terminal TX1 is assumed to be a voltage sustained at a constant level as shown in FIG. 12, the change of the voltage appearing between the gate and source electrodes of the MOS transistor 412 appears as an output at an internal output terminal RX as it is. That is to say, a component of the transmitted voltage signal VTX0 supplied from the internal input terminal TX0 undesirably sneaks around to the internal output terminal RX.

As shown in FIG. 13, however, a cancel signal is supplied to the internal input terminal TX1 as an AC component of VTX1 (=VTX0/2). It is thus possible to cancel the change of the voltage appearing between the gate and source electrodes of the MOS transistor 412. That is to say, by supplying the cancel signal to the internal input terminal TX1, it is possible to prevent a component of the transmitted voltage signal VTX0 from undesirably sneaking around to the internal output terminal RX.

By the way, as shown in FIG. 14, when a voltage signal VIO is received by the external input/output terminal IO from the transmission line 413, the internal input terminals TX0 and TX1 can be regarded as an AC ground. Thus, if the external input/output terminal IO and the internal output terminal RX are apprehended as an input terminal and an output terminal respectively, the full duplex transmission circuit shown in FIG. 14 can be perceived as a transimpedance amplifier. In this case, since the amplifier has an input resistance of $1/g_m$ (=Z) and an output resistance of $1/g_m$ (=Z), the voltage gain is 1.

The above description has explained operations carried out by a full duplex transmission circuit having the first configuration.

2-2-2: Operations of Fifth Configuration

Typical Modification

Figure 15:
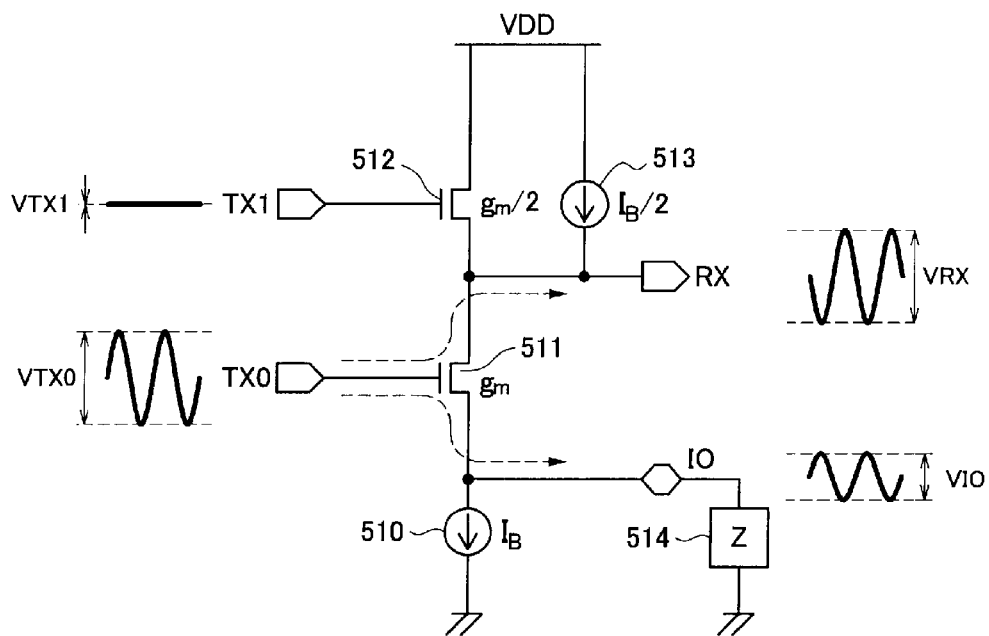
FIG. 15 is an explanatory diagram to be referred to in description of operations carried out by a typical modification of a full duplex transmission circuit employing MOS transistors in accordance with the same embodiment.
Figure 16:
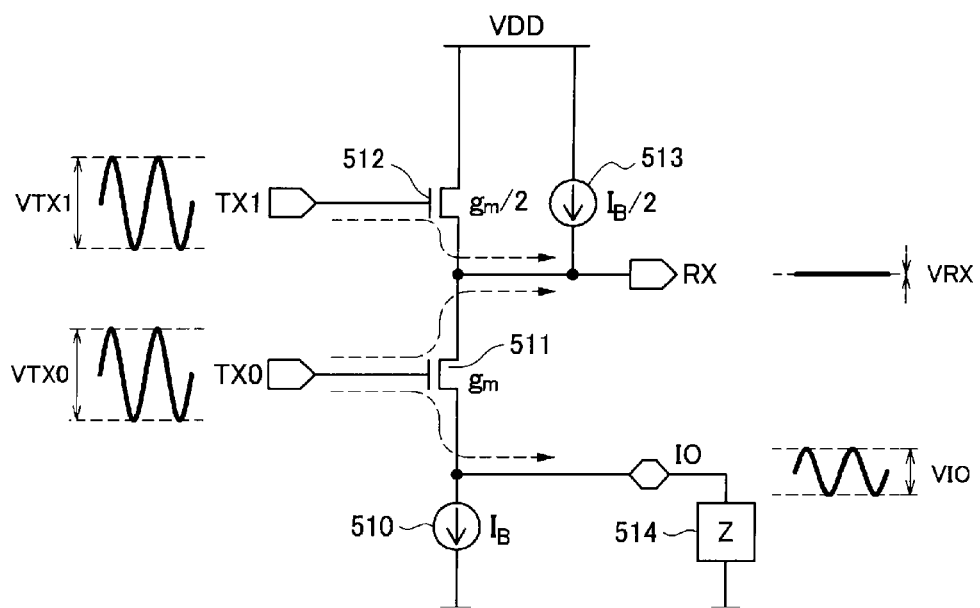
FIG. 16 is an explanatory diagram to be referred to in description of operations carried out by a typical modification of a full duplex transmission circuit employing MOS transistors in accordance with the same embodiment.
Figure 17:
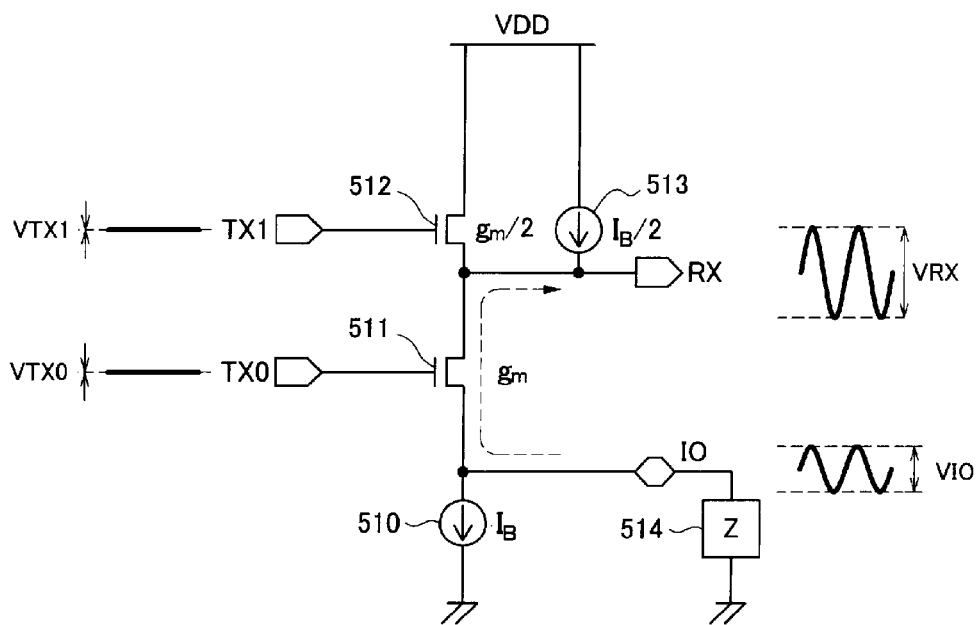
FIG. 17 is an explanatory diagram to be referred to in description of operations carried out by a typical modification of a full duplex transmission circuit employing MOS transistors in accordance with the same embodiment.

Next, operations carried out by the full duplex transmission circuit having the fifth configuration are explained by referring to FIGS. 15 to 17. It is to be noted that, even though each reference numeral and each symbol which are used in FIGS. 15 to 17 may be different from those used in FIG. 5, the circuit configuration shown in FIGS. 15 to 17 is the same as the circuit configuration shown in FIG. 5.

The magnitude of a bias current $I_B$ generated by a current source 510 is set so that the transconductance $g_m$ of a MOS transistor 511 is equal to 1/Z. Thus, the source resistance of the MOS transistor 511 is equal to Z. On the other hand, the output impedance of the current source 510 is ideally infinite. As a result, an external input/output terminal IO can be put in a state of matching the characteristic impedance Z of a transmission line 514.

In addition, the magnitude of a bias current generated by a current source 513 is set at $I_B/G$ so that the transconductance $g_m$ of a MOS transistor 512 is equal to 1/Z/G. In the following description, G=2 is assumed for the sake of simplicity. If a substrate bias effect and the like are ignored, with the bias current flowing through the current source 513 set at $I_B/2$, by setting the gate width of the MOS transistor 512 at ½ times the gate width of the MOS transistor 511, the transconductance $g_m$ of a MOS transistor 512 can be set $1/(2*Z)$, that is, $g_m=1/(2*Z)$.

When a transmitted voltage signal VTX0 is supplied from an internal input terminal TX0 as shown in FIG. 15, the transmitted voltage signal VTX0 is applied to a series circuit including the MOS transistor 511 with a source resistance Z and the transmission line 514 with a characteristic impedance Z to appear at the external input/output terminal IO as a signal resulting from resistance-based voltage division, that is, amplification at a voltage gain of ½. That is to say, a voltage signal VIO having a magnitude of VIO (=VTX0/2) is output from the external input/output terminal IO. At that time, a voltage appearing between the gate and source electrodes of the MOS transistor 511 changes by the following quantity: VTX0−VIO=VTX0/2. Thus, the change of the voltage appearing between the gate and source electrodes of the MOS transistor 511 causes a current flowing through the drain of the MOS transistor 511 to change by $g_m*$VTX0/2.

In addition, this change of the current flowing through the drain of the MOS transistor 511 by itself changes a current flowing through the source of a MOS transistor 512 and the change of the current flowing through the source of the MOS transistor 512 causes a voltage appearing between the gate and source electrodes of the MOS transistor 512 to change by the following quantity: VTX0 (=$g_m*$VTX0/2/($g_m/2$)). If a voltage appearing at an internal input terminal VTX1 is assumed to be a voltage sustained at a constant level as shown in FIG. 15, the change of the voltage appearing between the gate and source electrodes of the MOS transistor 512 appears as an output at an internal output terminal RX as it is. That is to say, a component of the transmitted voltage signal VTX0 supplied from the internal input terminal TX0 undesirably sneaks around to the internal output terminal RX.

As shown in FIG. 16, however, a cancel signal is supplied to the internal input terminal TX1 as an AC component of VTX1 (=VTX0). It is thus possible to cancel the change of the voltage appearing between the gate and source electrodes of the MOS transistor 512. That is to say, by supplying the cancel signal to the internal input terminal TX1, it is possible to prevent a component of the transmitted voltage signal VTX0 supplied to the internal input terminal TX0 from undesirably sneaking around to the internal output terminal RX.

By the way, as shown in FIG. 17, when a voltage signal VIO is received by the external input/output terminal IO from the transmission line 514, the internal input terminals TX0 and TX1 can be regarded as an AC ground. Thus, if the external input/output terminal IO and the internal output terminal RX are apprehended as an input terminal and an output terminal respectively, the full duplex transmission circuit shown in FIGS. 15 to 17 can be perceived as a transimpedance amplifier. In this case, since the amplifier has an input resistance of $1/g_m$ (=Z) and an output resistance of $2/g_m$ (=2*Z), the voltage gain is 2.

The above description has explained operations carried out by a full duplex transmission circuit having the fifth configuration.

2-3: Typical Applications to Apparatus Internal Transmissions

Next, the following description explains some typical configurations provided for a case in which the full duplex transmission circuits described above are applied to signal transmissions inside an electronic apparatus. It is to be noted that, by applying full duplex transmission circuits to signal transmissions inside an electronic apparatus in these typical configurations, it is possible to carry out typically the signal transmissions inside the electronic apparatus in order to transmit image data from a processing section included in a first processing module to a second processing module connected by a transmission line to the first processing module through the transmission line and in order to display an image based on the image data on a display section included in the second processing module. In addition, such a configuration also allows data entered to an input section employed in the second processing module to be transmitted to the processing section of the first processing module in signal transmissions inside the electronic apparatus. A typical example of the input section is a switch. It is needless to say that a technology to be described later can be adopted for carrying out a signal transmission inside an electronic apparatus to transmit data from a processing module to another processing module.

2-3-1: Typical Application of First Configuration

Basic Configuration

Figure 18:
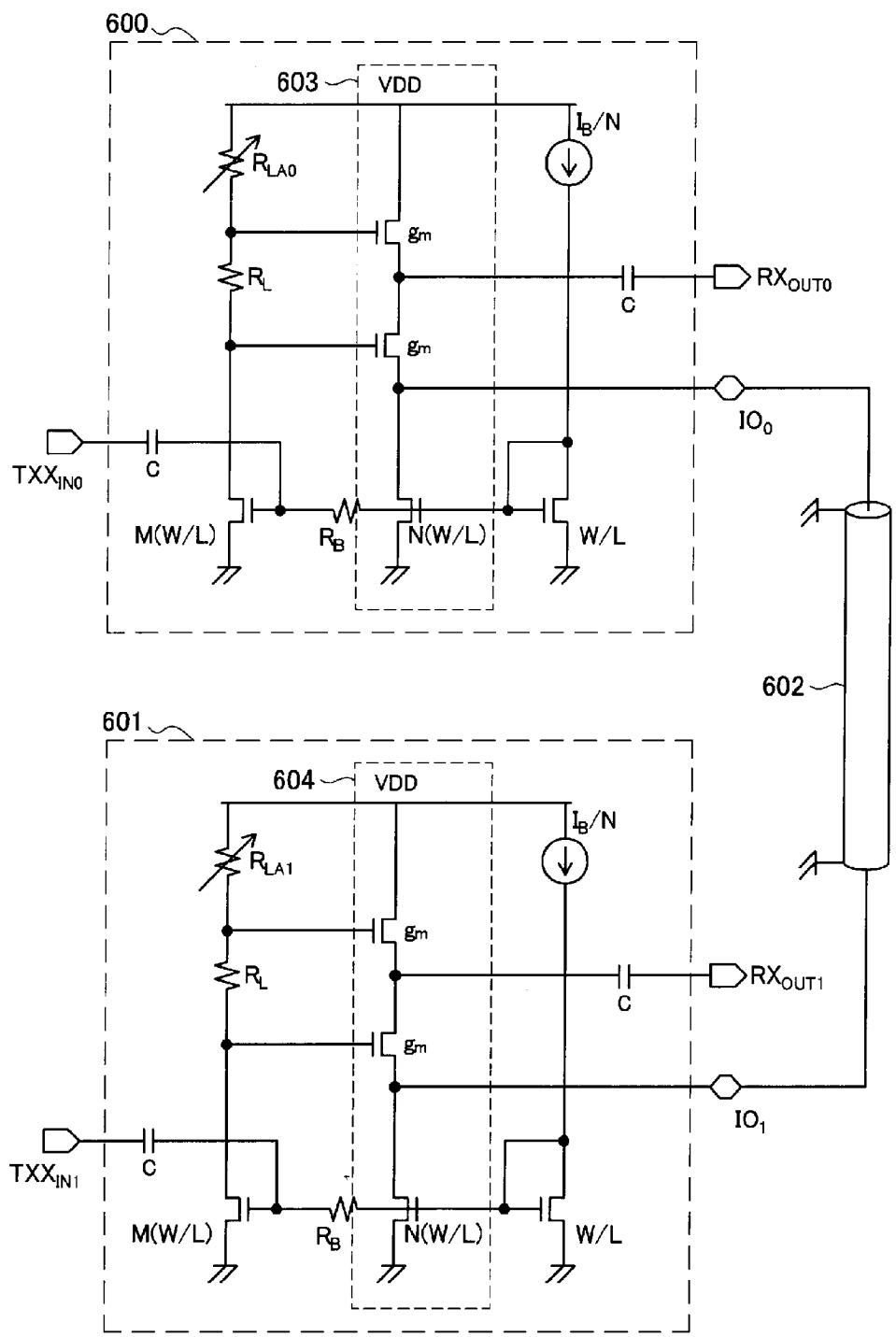
FIG. 18 is an explanatory diagram to be referred to in description of the configuration of an electronic apparatus carrying out duplex data transmissions between full duplex transmission circuits each having a basic configuration according to an embodiment.

FIG. 18 is an explanatory diagram referred to in the following description of the configuration of an electronic apparatus carrying out duplex data transmissions between single-end (non-differential) full duplex transmission circuits each including the basic configuration making use of MOS transistors in accordance with the embodiment. As shown in FIG. 18, the electronic apparatus employs two full duplex transmission devices, that is, full duplex transmission devices 600 and 601. The full duplex transmission devices 600 and 601 are connected to each other by a transmission line 602.

A signal received from a terminal $TXX_{IN0}$ of the full duplex transmission device 600 is output from a terminal $RX_{OUT1}$ of the full duplex transmission device 601. On the other hand, a signal received from a terminal $TXX_{IN1}$ of the full duplex transmission device 601 is output from a terminal $RX_{OUT0}$ of the full duplex transmission device 600. The full duplex transmission device 600 includes a full duplex transmission circuit 603 having the first configuration whereas the full duplex transmission device 601 includes a full duplex transmission circuit 604 having the first configuration. It is to be noted that, in this case, the voltage gain of the signal receiving buffer in each of the full duplex transmission circuits 603 and 604 is 1.

The configuration of the full duplex transmission device 600 shown in FIG. 18 is designed so that a resistance $R_{LA0}$ can be adjusted. Thus, the configuration can be calibrated to minimize the magnitude of a signal sneaking around from the terminal $TXX_{IN0}$ to the terminal $RX_{OUT0}$. By the same token, the configuration of the full duplex transmission device 601 shown in FIG. 18 is designed so that a resistance $R_{LA1}$ can also be adjusted. Thus, the configuration can be calibrated to minimize the magnitude of a signal sneaking around from the terminal $TXX_{IN1}$ to the terminal $RX_{OUT1}$. By applying the full duplex transmission device 600 including the full duplex transmission circuit 603 having the first configuration and the full duplex transmission device 601 including the full duplex transmission circuit 604 having the first configuration to an electronic apparatus as described above, signal full duplex transmissions can be carried out in the electronic apparatus.

The above description has explained a typical application of the basic configuration serving as the first configuration to an electronic apparatus.

2-3-2: Typical Application of the Fifth Configuration

Typical Modification

Figure 19:
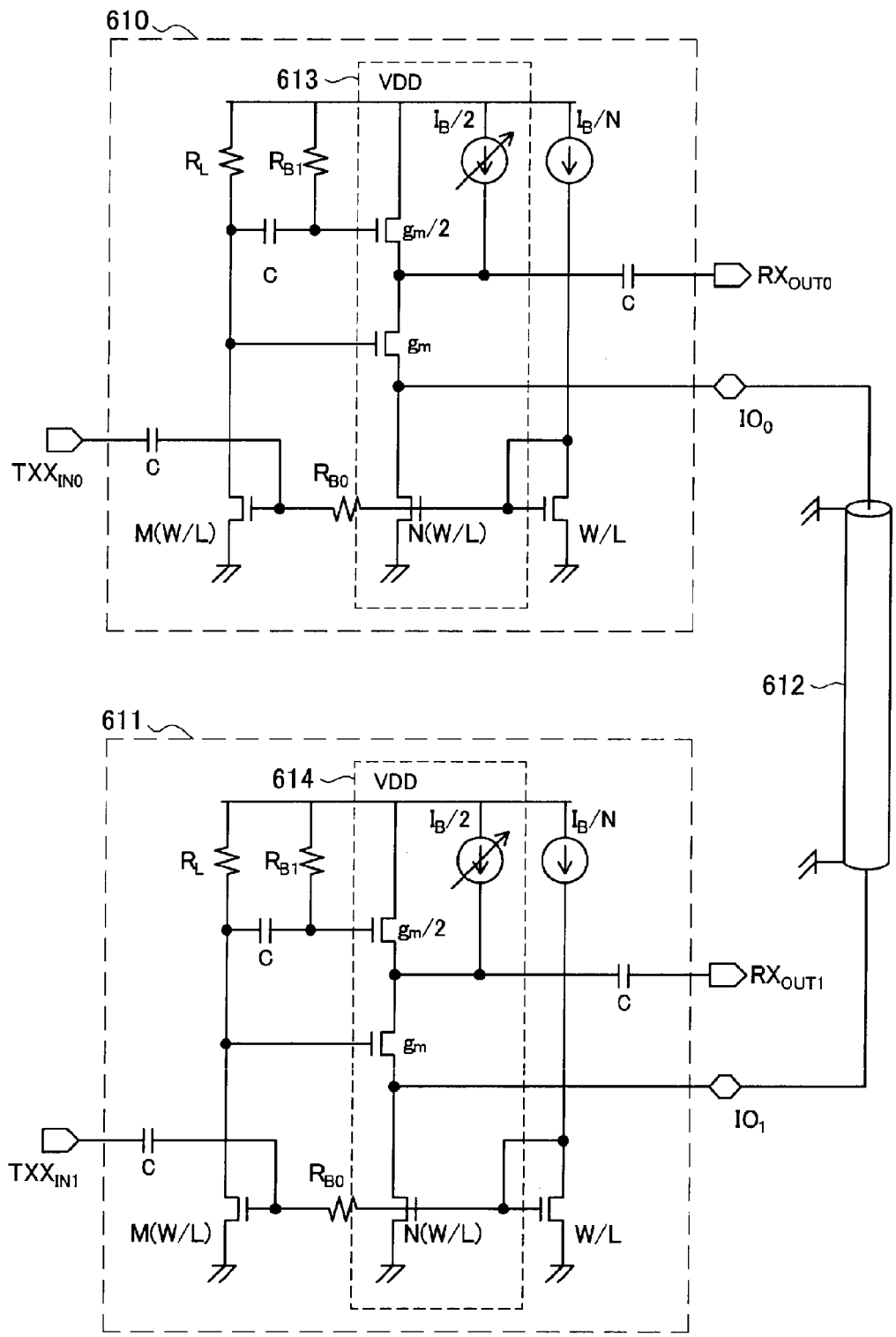
FIG. 19 is an explanatory diagram to be referred to in description of the configuration of an electronic apparatus carrying out duplex data transmissions between full duplex transmission circuits each having a modified configuration according to an embodiment.

FIG. 19 is an explanatory diagram referred to in the following description of the configuration of an electronic apparatus carrying out duplex data transmissions between single-end full duplex transmission circuits each including the typical modification making use of MOS transistors in accordance with the embodiment. As shown in FIG. 19, the electronic apparatus employs two full duplex transmission devices, that is, full duplex transmission devices 610 and 611. The full duplex transmission devices 610 and 611 are connected to each other by a transmission line 612.

A signal received from a terminal $TXX_{IN0}$ of the full duplex transmission device 610 is output from a terminal $RX_{OUT1}$ of the full duplex transmission device 611. On the other hand, a signal received from a terminal $TXX_{IN1}$ of the full duplex transmission device 611 is output from a terminal $RX_{OUT0}$ of the full duplex transmission device 610. The full duplex transmission device 610 includes a full duplex transmission circuit 613 having the fifth configuration whereas the full duplex transmission device 611 includes a full duplex transmission circuit 614 having the fifth configuration. It is to be noted that, in this case, the voltage gain of the signal receiving buffer in each of the full duplex transmission circuits 613 and 614 is 2.

The configuration of the full duplex transmission device 610 shown in FIG. 19 is designed so that the magnitude of a current $I_B/2$ generated by a current source employed in the full duplex transmission circuit 613 can be adjusted. Thus, the configuration can be calibrated to minimize the magnitude of a signal sneaking around from the terminal $TXX_{IN0}$ to the terminal $RX_{OUT0}$. By the same token, the configuration of the full duplex transmission device 611 shown in FIG. 19 is designed so that the magnitude of a current $I_B/2$ generated by a current source employed in the full duplex transmission circuit 614 can be adjusted. Thus, the configuration can be calibrated to minimize the magnitude of a signal sneaking around from the terminal $TXX_{IN1}$ to the terminal $RX_{OUT1}$. By applying the full duplex transmission device 610 including the full duplex transmission circuit 613 having the fifth configuration and the full duplex transmission device 611 including the full duplex transmission circuit 614 having the fifth configuration to an electronic apparatus as described above, signal full duplex transmissions can be carried out in the electronic apparatus.

The above description has explained a typical application of the typical modification serving as the fifth configuration to an electronic apparatus.

2-3-3: Typical Application of Third Configuration

Differential Implementation of Basic Configuration

Figure 20:
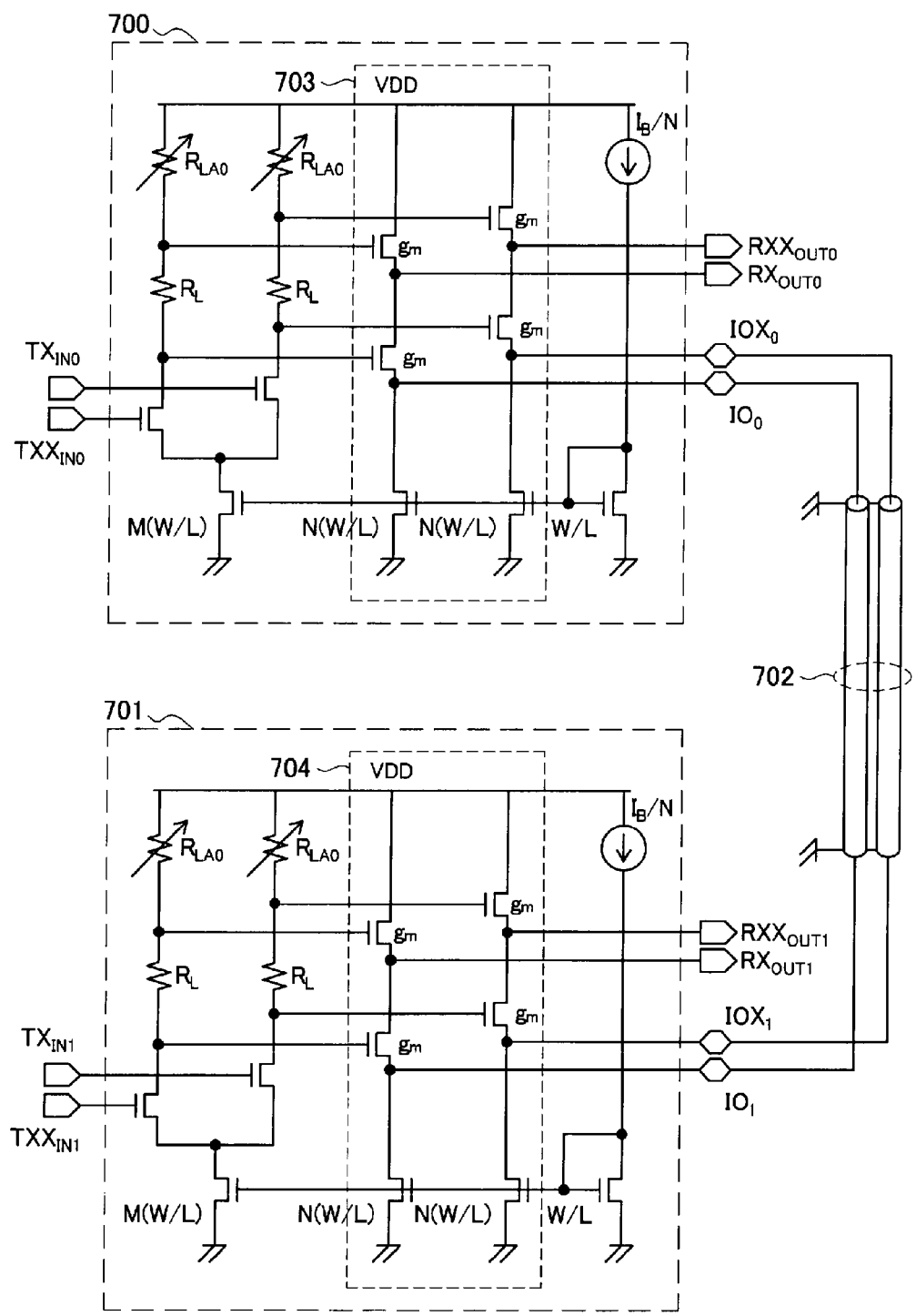
FIG. 20 is an explanatory diagram to be referred to in description of the configuration of an electronic apparatus carrying out duplex data transmissions between full duplex transmission circuits each having a differential-signal-based implementation of the basic configuration according to the same embodiment.

FIG. 20 is an explanatory diagram referred to in the following description of the configuration of an electronic apparatus carrying out duplex data transmissions between differential full duplex transmission circuits each including the differential-signal-based implementation of the basic configuration making use of MOS transistors in accordance with the embodiment. As shown in FIG. 20, the electronic apparatus employs two full duplex transmission devices, that is, full duplex transmission devices 700 and 701. The full duplex transmission devices 700 and 701 are connected to each other by two transmission lines 702.

Differential signals received from terminals $TX_{IN0}$ and $TXX_{IN0}$ of the full duplex transmission device 700 are output from terminals $RX_{OUT1}$ and $RXX_{OUT1}$ of the full duplex transmission device 701. On the other hand, differential signals received from terminals $TX_{IN1}$ and $TXX_{IN1}$ of the full duplex transmission device 701 are output from terminals $RX_{OUT0}$ and $RXX_{OUT0}$ of the full duplex transmission device 700. The full duplex transmission device 700 includes a full duplex transmission circuit 703 having the third configuration whereas the full duplex transmission device 701 includes a full duplex transmission circuit 704 having the third configuration. It is to be noted that, in this case, the voltage gain of the signal receiving buffer in each of the full duplex transmission circuits 703 and 704 is 1.

The configuration of the full duplex transmission device 700 shown in FIG. 20 is designed so that resistances $R_{LA0}$ can be adjusted. Thus, the configuration can be calibrated to minimize the magnitude of signals sneaking around from the terminals $TX_{IN0}$ and $TXX_{IN0}$ to the terminals $RX_{OUT0}$ and $RXX_{OUT0}$. By the same token, the configuration of the full duplex transmission device 701 shown in FIG. 20 is designed so that resistances $R_{LA1}$ can also be adjusted. Thus, the configuration can be calibrated to minimize the magnitude of a signal sneaking around from the terminals $TX_{IN1}$ and $TXX_{IN1}$ to the terminals $RX_{OUT1}$ and $RXX_{OUT1}$. By applying the full duplex transmission device 700 including the full duplex transmission circuit 703 having the third configuration and the full duplex transmission device 701 including the full duplex transmission circuit 704 having the third configuration to an electronic apparatus as described above, signal full duplex transmissions can be carried out in the electronic apparatus.

The above description has explained a typical application of the differential-signal-based implementation realizing the basic configuration to serve as the third configuration to an electronic apparatus.

2-3-4: Typical Application of Seventh Configuration

Differential Implementation of Typical Modification

FIG. 21 is an explanatory diagram referred to in the following description of the configuration of an electronic apparatus carrying out duplex data transmissions between differential full duplex transmission circuits each including the differential-signal-based implementation of the typical modification making use of MOS transistors in accordance with the embodiment. As shown in FIG. 21, the electronic apparatus employs two full duplex transmission devices, that is, full duplex transmission devices 710 and 711. The full duplex transmission devices 710 and 711 are connected to each other by two transmission lines 712.

Differential signals received from terminals $TX_{IN0}$ and $TXX_{IN0}$ of the full duplex transmission device 710 are output from terminals $RX_{OUT1}$ and $RXX_{OUT1}$ of the full duplex transmission device 711. On the other hand, differential signals received from terminals $TX_{IN1}$ and $TXX_{IN1}$ of the full duplex transmission device 711 are output from terminals $RX_{OUT0}$ and $RXX_{OUT0}$ of the full duplex transmission device 710. The full duplex transmission device 710 includes a full duplex transmission circuit 713 having the seventh configuration whereas the full duplex transmission device 711 includes a full duplex transmission circuit 714 having the seventh configuration. It is to be noted that, in this case, the voltage gain of the signal receiving buffer in each of the full duplex transmission circuits 713 and 714 is 2.

The configuration of the full duplex transmission device 710 shown in FIG. 21 is designed so that the magnitude of a current $I_B/2$ generated by a current source employed in the full duplex transmission circuit 713 can be adjusted. Thus, the configuration can be calibrated to minimize the magnitude of a signal sneaking around from the terminals $TX_{IN0}$ and $TXX_{IN0}$ to the terminals $RX_{OUT0}$ and $RXX_{OUT0}$. By the same token, the configuration of the full duplex transmission device 711 shown in FIG. 21 is designed so that the magnitude of a current $I_B/2$ generated by a current source employed in the full duplex transmission circuit 714 can be adjusted. Thus, the configuration can be calibrated to minimize the magnitude of a signal sneaking around from the terminals $TX_{IN1}$ and $TXX_{IN1}$ to the terminals $RX_{OUT1}$ and $RXX_{OUT1}$. By applying the full duplex transmission device 710 including the full duplex transmission circuit 713 having the seventh configuration and the full duplex transmission device 711 including the full duplex transmission circuit 714 having the seventh configuration to an electronic apparatus as described above, signal full duplex transmissions can be carried out in the electronic apparatus.

The above description has explained a typical application of the differential configuration implementing the typical modification to serve as the seventh configuration to an electronic apparatus.

3: Conclusions

Technologies according to the embodiments have been explained so far. By applying the technologies according to the embodiments, a bias current flowing from a power supply to the ground can be used for implementing all functions of a signal transmitting buffer, a signal receiving buffer and a hybrid circuit. As a result, at a power consumption about equivalent to that of a half full duplex transmission circuit, duplex data transmissions can be realized. In addition, in the case of the fifth and sixth configurations, the magnitude of a current flowing through a transistor can be adjusted. Then, by adjusting the magnitude of this current, the source resistance of the MOS transistor (or the emitter resistance of the bipolar transistor) can be set at a value greater than the characteristic impedance Z of the transmission line. For example, the voltage gain of a transimpedance amplifier can also be set at a value not smaller than 1. As a result, the voltage gain of the first-stage circuit of the signal receiving buffer can be raised. On top of that, the differential-signal-based implementations can be constructed with ease as is obvious from the third configuration shown in FIG. 3, the fourth configuration shown in FIG. 4, the seventh configuration shown in FIG. 7, and the eighth configuration shown in FIG. 8.

It should be understood by those skilled in the art that various modifications, combinations, sub-combinations and alterations may occur depending on design requirements and other factors insofar as they are within the scope of the appended claims or the equivalents thereof.

The present disclosure contains subject matter related to that disclosed in Japanese Priority Patent Application JP 2010-288543 filed in the Japan Patent Office on Dec. 24, 2010, the entire content of which is hereby incorporated by reference.

What is claimed is:

1. A full duplex transmission circuit comprising:
 a first internal input terminal receiving a signal to be transmitted;
 a second internal input terminal receiving a signal having an amplitude equal to ½ times an amplitude of the signal to be transmitted and having a same phase as a phase of the signal to be transmitted;
 an external input/output terminal connected to a transmission line having a characteristic impedance Z;
 an internal output terminal being output a received signal from the external input/output terminal;
 a first metal oxide semiconductor transistor having a source thereof connected to a current source and the external input/output terminal, a gate thereof connected to the first internal input terminal, and a drain thereof connected to a source of a second metal oxide semiconductor transistor and the internal output terminal, wherein the received signal is amplified by the first metal oxide semiconductor transistor and output from the drain of the first metal oxide semiconductor transistor to the internal output terminal; and
 the second metal oxide semiconductor transistor having a source thereof connected to the drain of the first metal oxide semiconductor transistor and the internal output terminal, and a gate thereof connected to the second internal input terminal, wherein a current generated by the current source and sizes of the first and second metal oxide semiconductor transistors are set so that transconductances of the first and second metal oxide semiconductor transistors become equal to 1/Z.

2. A full duplex transmission circuit comprising:
 a first internal input terminal receiving a signal to be transmitted;
 a second internal input terminal receiving a signal having an amplitude equal to ½ times an amplitude of the signal to be transmitted and having a same phase as a phase of the signal to be transmitted;
 an external input/output terminal connected to a transmission line having a characteristic impedance Z;
 an internal output terminal being output a received signal from the external input/output terminal;
 a first bipolar transistor having an emitter thereof connected to a current source and the external input/output terminal, a base thereof connected to the first internal input terminal, and a collector thereof connected to an emitter of a second bipolar transistor and the internal output terminal, wherein the received signal is amplified by the first bipolar transistor and output from the collector of the first bipolar transistor to the internal output terminal; and the second bipolar transistor having the emitter thereof connected to the collector of the first bipolar transistor and the internal output terminal, and a base thereof connected to a second internal input terminal, wherein a current generated by the current source is set so that a resistance of the emitter of the first bipolar transistor becomes equal to Z.

3. A full duplex transmission circuit comprising:
a first internal input terminal receiving a first differential signal;
a second internal input terminal receiving a signal having an amplitude equal to ½ times an amplitude of the first differential signal and having a same phase as a phase of the first differential signal;
a third internal input terminal receiving a second differential signal forming a signal pair in conjunction with the first differential signal;
a fourth internal input terminal receiving a signal having an amplitude equal to ½ times an amplitude of the second differential signal and having a same phase as a phase of the second differential signal;
a first external input/output terminal connected to a first transmission line having a characteristic impedance Z;
a second external input/output terminal connected to a second transmission line having a characteristic impedance Z;
a first internal output terminal being output a third differential signal from the first external input/output terminal;
a second internal output terminal being output a fourth differential signal from the second external input/output terminal as the fourth differential signal forming a signal pair in conjunction with the third differential signal;
a first metal oxide semiconductor transistor having a source thereof connected to a first current source and the first external input/output terminal, a gate thereof connected to the first internal input terminal, and a drain thereof connected to a source of a second metal oxide semiconductor transistor and the first internal output terminal, wherein the third differential signal is amplified by the first metal oxide semiconductor transistor and output from the drain of the first metal oxide semiconductor transistor to the first internal output terminal;
the second metal oxide semiconductor transistor having the source thereof connected to the drain of the first metal oxide semiconductor transistor and the first internal output terminal, and a gate thereof connected to the second internal input terminal;
a third metal oxide semiconductor transistor having a source thereof connected to a second current source and the second external input/output terminal, a gate thereof connected to the third internal input terminal, and a drain thereof connected to a source of a fourth metal oxide semiconductor transistor and the second internal output terminal; and
the fourth metal oxide semiconductor transistor having the source thereof connected to the drain of the third metal oxide semiconductor transistor and the second internal output terminal and a gate thereof connected to the fourth internal input terminal, wherein a current generated by the first current source and sizes of the first and second metal oxide semiconductor transistors are set so that transconductances of the first and second metal oxide semiconductor transistors become equal to 1/Z, and wherein a current generated by the second current source and sizes of the third and fourth metal oxide semiconductor transistors are set so that transconductances of the third and fourth metal oxide semiconductor transistors become equal to 1/Z.

4. A full duplex transmission circuit comprising:
a first internal input terminal receiving a first differential signal;
a second internal input terminal receiving a signal having an amplitude equal to ½ times an amplitude of the first differential signal and having a same phase as a phase of the first differential signal;
a third internal input terminal receiving a second differential signal forming a signal pair in conjunction with the first differential signal;
a fourth internal input terminal receiving a signal having an amplitude equal to ½ times an amplitude of the second differential signal and having a same phase as a phase of the second differential signal;
a first external input/output terminal connected to a first transmission line having a characteristic impedance Z;
a second external input/output terminal connected to a second transmission line having a characteristic impedance Z;
a first internal output terminal being output a third differential signal from the first external input/output terminal;
a second internal output terminal being output a fourth differential signal from the second external input/output terminal as the fourth differential signal forming a signal pair in conjunction with the third differential signal;
a first bipolar transistor having an emitter thereof connected to a first current source and the first external input/output terminal, a base thereof connected to the first internal input terminal, and a collector thereof connected to an emitter of a second bipolar transistor and the first internal output terminal, wherein the third differential signal is amplified by the first bipolar transistor and output from the collector of the first bipolar transistor to the first internal output terminal;
the second bipolar transistor having the emitter thereof connected to the collector of the first bipolar transistor and the first internal output terminal, and a base thereof connected to the second internal input terminal;
a third bipolar transistor having an emitter thereof connected to a second current source and the second external input/output terminal, a base thereof connected to the third internal input terminal, and a collector thereof connected to the emitter of a fourth bipolar transistor and the second internal output terminal; and
the fourth bipolar transistor having the emitter thereof connected to the collector of the third bipolar transistor and the second internal output terminal, and a base thereof connected to the fourth internal input terminal,
wherein a current generated by the first current source is set so that a resistance of the emitter of the first bipolar transistor becomes equal to Z, and
wherein a current generated by the second current source is set so that a resistance of the emitter of the second bipolar transistor becomes equal to Z.

5. A full duplex transmission circuit comprising:
a first internal input terminal receiving a signal to be transmitted;
a second internal input terminal receiving a signal having an amplitude equal to G/2 times an amplitude of the signal to be transmitted and having a same phase as a phase of the signal to be transmitted, where G>1;
an external input/output terminal connected to a transmission line having a characteristic impedance Z;
an internal output terminal being output a received signal from the external input/output terminal;
a first metal oxide semiconductor transistor having a source thereof connected to a first current source and the external input/output terminal, a gate thereof connected to the first internal input terminal, and a drain thereof connected to a source of a second metal oxide semiconductor transistor and the internal output terminal, wherein the received signal is amplified by the first metal oxide semiconductor transistor and output from the drain of the first metal oxide semiconductor transistor to the internal output terminal; and
the second metal oxide semiconductor transistor having the source thereof connected to the drain of the first metal oxide semiconductor transistor, the second current source and the internal output terminal, and a gate thereof connected to the second internal input terminal,
wherein a current generated by the first current source and a size of the first metal oxide semiconductor transistor are set so that a transconductance of the first metal oxide semiconductor transistor becomes equal to 1/Z, and
a current generated by the second current source and a size of the second metal oxide semiconductor transistor are set so that a transconductance of the second metal oxide semiconductor transistor becomes equal to 1/G times the transconductance of the first metal oxide semiconductor transistor.

6. A full duplex transmission circuit comprising:
a first internal input terminal receiving a signal to be transmitted;
a second internal input terminal receiving a signal having an amplitude equal to G/2 times an amplitude of the signal to be transmitted and having a same phase as a phase of the signal to be transmitted, where G>1;
an external input/output terminal connected to a transmission line having a characteristic impedance Z;
an internal output terminal being output a received signal from the external input/output terminal;
a first bipolar transistor having an emitter thereof connected to a first current source and the external input/output terminal, a base thereof connected to the first internal input terminal and a collector thereof connected to an emitter of a second bipolar transistor and the internal output terminal, wherein the received signal is amplified by the first bipolar transistor and output from the collector of the first bipolar transistor to the internal output terminal; and
the second bipolar transistor having the emitter thereof connected to the collector of the first bipolar transistor, the second current source and the internal output terminal and a base thereof connected to the second internal input terminal,
wherein a current generated by the first current source is set so that a resistance of the emitter of the first bipolar transistor becomes equal to Z, and
a current generated by the second current source is set so that a resistance of the emitter of the second bipolar transistor becomes equal to G times the resistance of the emitter of the first bipolar transistor.

7. A full duplex transmission circuit comprising:
a first internal input terminal receiving a first differential signal;
a second internal input terminal receiving a signal having an amplitude equal to G/2 times an amplitude of the first differential signal and having a same phase as a phase of the first differential signal, where G>1;
a third internal input terminal receiving a second differential signal forming a signal pair in conjunction with the first differential signal;
a fourth internal input terminal receiving a signal having an amplitude equal to G/2 times an amplitude of the second differential signal and having a same phase as a phase of the second differential signal;
a first external input/output terminal connected to a first transmission line having a characteristic impedance Z;
a second external input/output terminal connected to a second transmission line having a characteristic impedance Z;
a first internal output terminal being output a third differential signal from the first external input/output terminal;
a second internal output terminal being output a fourth differential signal from the second external input/output terminal as the fourth differential signal forming a signal pair in conjunction with the third differential signal;
a first metal oxide semiconductor transistor having a source thereof connected to a first current source and the first external input/output terminal, a gate thereof connected to the first internal input terminal, and a drain thereof connected to a source of a second metal oxide semiconductor transistor and the first internal output terminal, wherein the third differential signal is amplified by the first metal oxide semiconductor transistor and output from the drain of the first metal oxide semiconductor transistor to the first internal output terminal;
the second metal oxide semiconductor transistor having the source thereof connected to the drain of the first metal oxide semiconductor transistor, the second current source and the first internal output terminal, and gate thereof connected to the second internal input terminal;
a third metal oxide semiconductor transistor having a source thereof connected to a third current source and the second external input/output terminal, a gate thereof connected to the third internal input terminal, and a drain thereof connected to a source of a fourth metal oxide semiconductor transistor and the second internal output terminal; and
the fourth metal oxide semiconductor transistor having the source thereof connected to the drain of the third metal oxide semiconductor transistor, the fourth current source and the second internal output terminal, and gate thereof connected to the fourth internal input terminal,
wherein a current generated by the first current source and a size of the first metal oxide semiconductor transistor are set so that a transconductance of the first metal oxide semiconductor transistor becomes equal to 1/Z,
a current generated by the second current source and a size of the second metal oxide semiconductor transistor are set so that a transconductance of the second metal oxide semiconductor transistor becomes equal to 1/G times the transconductance of the first metal oxide semiconductor transistor,
a current generated by the third current source and a size of the third metal oxide semiconductor transistor are set so that a transconductance of the third metal oxide semiconductor transistor becomes equal to 1/Z, and a current generated by the fourth current source and a size of the fourth metal oxide semiconductor transistor are set so that a transconductance of the fourth metal oxide semiconductor transistor becomes equal to 1/G times the transconductance of the third metal oxide semiconductor transistor.

8. A full duplex transmission circuit comprising:
a first internal input terminal receiving a first differential signal;
a second internal input terminal receiving a signal having an amplitude equal to G/2 times an amplitude of the first differential signal and having a same phase as a phase of the first differential signal, where G>1;
a third internal input terminal receiving a second differential signal forming a signal pair in conjunction with the first differential signal;
a fourth internal input terminal receiving a signal having an amplitude equal to G/2 times an amplitude of the second differential signal and having a same phase as a phase of the second differential signal;
a first external input/output terminal connected to a first transmission line having a characteristic impedance Z;
a second external input/output terminal connected to a second transmission line having a characteristic impedance Z;
a first internal output terminal being output a third differential signal from the first external input/output terminal;
a second internal output terminal being output a fourth differential signal from the second external input/output terminal as the fourth differential signal forming a signal pair in conjunction with the third differential signal;
a first bipolar transistor having an emitter thereof connected to a first current source and the first external input/output terminal, a base thereof connected to the first internal input terminal and a collector thereof connected to an emitter of a second bipolar transistor and the first internal output terminal, wherein the third differential signal is amplified by the first bipolar transistor and output from the collector of the first bipolar transistor to the first internal output terminal;
the second bipolar transistor having the emitter thereof connected to the collector of the first bipolar transistor, the second current source and the first internal output terminal, and a base thereof connected to the second internal input terminal;
a third bipolar transistor having an emitter thereof connected to a third current source and the second external input/output terminal, a base thereof connected to the third internal input terminal, and a collector thereof connected to an emitter of a fourth bipolar transistor and the second internal output terminal; and
the fourth bipolar transistor having the emitter thereof connected to the collector of the third bipolar transistor, the fourth current source and the second internal output terminal, and a base thereof connected to the fourth internal input terminal,
wherein a current generated by the first current source is set so that a resistance of the emitter of the first bipolar transistor becomes equal to Z,
a current generated by the second current source is set so that a resistance of the emitter of the second bipolar transistor becomes equal to G times the resistance of the emitter of the first bipolar transistor,
a current generated by the third current source is set so that a resistance of the emitter of the third bipolar transistor becomes equal to Z, and
a current generated by the fourth current source is set so that a resistance of the emitter of the fourth bipolar transistor becomes equal to G times the resistance of the emitter of the third bipolar transistor.

9. An electronic apparatus comprising:
a first full duplex transmission circuit;
a second full duplex transmission circuit; and
a transmission line connecting an external input/output terminal of the first full duplex transmission circuit to an external input/output terminal of the second full duplex transmission circuit, each of the first and second full duplex transmission circuits comprising:
a first internal input terminal receiving a signal to be transmitted,
a second internal input terminal receiving a signal having an amplitude equal to ½ times an amplitude of the signal to be transmitted and having a same phase as a phase of the signal to be transmitted,
the external input/output terminal connected to the transmission line having a characteristic impedance Z,
an internal output terminal being output a received signal from the external input/output terminal,
a first metal oxide semiconductor transistor having a source thereof connected to a current source and the external input/output terminal, a gate thereof connected to the first internal input terminal, and a drain thereof connected to a source of a second metal oxide semiconductor transistor and the internal output terminal, wherein the received signal is amplified by the first metal oxide semiconductor transistor and output from the drain of the first metal oxide semiconductor transistor to the internal output terminal, and
the second metal oxide semiconductor transistor having the source thereof connected to the drain of the first metal oxide semiconductor transistor and the internal output terminal, and a gate thereof connected to the second internal input terminal,
wherein a current generated by the current source and sizes of the first and second metal oxide semiconductor transistors are set so that transconductances of the first and second metal oxide semiconductor transistors become equal to 1/Z.

10. An electronic apparatus comprising:
a first full duplex transmission circuit;
a second full duplex transmission circuit; and
a transmission line connecting an external input/output terminal of the first full duplex transmission circuit to an external input/output terminal of the second full duplex transmission circuit, each of the first and second full duplex transmission circuits comprising:
a first internal input terminal receiving a signal to be transmitted,
a second internal input terminal receiving a signal having an amplitude equal to ½ times an amplitude of the signal to be transmitted and having a same phase as a phase of the signal to be transmitted,
the external input/output terminal connected to the transmission line having a characteristic impedance Z,
an internal output terminal being output a received signal from the external input/output terminal,
a first bipolar transistor having an emitter thereof connected to a current source and the external input/ output terminal, a base thereof connected to the first internal input terminal, and a collector thereof connected to the emitter of a second bipolar transistor and the internal output terminal, wherein the received signal is amplified by the first bipolar transistor and output from the collector of the first bipolar transistor to the internal output terminal, and the second bipolar transistor having an emitter thereof connected to the collector of the first bipolar transistor and the internal output terminal, and a base thereof connected to the second internal input terminal, wherein a current generated by the current source is set so that a resistance of the emitter of the first bipolar transistor becomes equal to Z.

11. An electronic apparatus comprising:

a first full duplex transmission circuit;

a second full duplex transmission circuit; and first and second transmission lines connecting first and second external input/output terminals of the first full duplex transmission circuit to first and second external input/output terminals of the second full duplex transmission circuit, each of the first and second full duplex transmission circuits comprising:

a first internal input terminal receiving a first differential signal, a second internal input terminal receiving a signal having an amplitude equal to ½ times an amplitude of the first differential signal and having a same phase as a phase of the first differential signal, a third internal input terminal receiving a second differential signal forming a signal pair in conjunction with the first differential signal, a fourth internal input terminal receiving a signal having an amplitude equal to ½ times an amplitude of the second differential signal and having a same phase as a phase of the second differential signal, the first external input/output terminal connected to the first transmission line having a characteristic impedance Z, the second external input/output terminal connected to the second transmission line having a characteristic impedance Z, a first internal output terminal being output a third differential signal from the first external input/output terminal, a second internal output terminal being output a fourth differential signal from the second external input/output terminal as the fourth differential signal forming a signal pair in conjunction with the third differential signal, a first metal oxide semiconductor transistor having a source thereof connected to a first current source and the first external input/output terminal, a gate thereof connected to the first internal input terminal, and a drain thereof connected to a source of a second metal oxide semiconductor transistor and the first internal output terminal, wherein the third differential signal is amplified by the first metal oxide semiconductor transistor and output from the drain of the first metal oxide semiconductor transistor to the first internal output terminal, the second metal oxide semiconductor transistor having the source thereof connected to the drain of the first metal oxide semiconductor transistor and the first internal output terminal, and a gate thereof connected to the second internal input terminal;

a third metal oxide semiconductor transistor having a source thereof connected to a second current source and the second external input/output terminal, a gate thereof connected to the third internal input terminal, and a drain thereof connected to a source of a fourth metal oxide semiconductor transistor and the second internal output terminal, and the fourth metal oxide semiconductor transistor having the source thereof connected to the drain of the third metal oxide semiconductor transistor and the second internal output terminal, and a gate thereof connected to the fourth internal input terminal, wherein a current generated by the first current source as well as sizes of the first and second metal oxide semiconductor transistors are set so that transconductances of the first and second metal oxide semiconductor transistors become equal to 1/Z, and wherein a current generated by the second current source as well as sizes of the third and fourth metal oxide semiconductor transistors are set so that transconductances of the third and fourth metal oxide semiconductor transistors become equal to 1/Z.

12. An electronic apparatus comprising:

a first full duplex transmission circuit;

a second full duplex transmission circuit; and first and second transmission lines connecting first and second external input/output terminals of the first full duplex transmission circuit to first and second external input/output terminals of the second full duplex transmission circuit, each of the first and second full duplex transmission circuits comprising:

a first internal input terminal receiving a first differential signal, a second internal input terminal receiving a signal having an amplitude equal to ½ times an amplitude of the first differential signal and having a same phase as a phase of the first differential signal, a third internal input terminal receiving a second differential signal forming a signal pair in conjunction with the first differential signal, a fourth internal input terminal receiving a signal having an amplitude equal to ½ times an amplitude of the second differential signal and having a same phase as a phase of the second differential signal, a first external input/output terminal connected to a first transmission line having a characteristic impedance Z, a second external input/output terminal connected to a second transmission line having a characteristic impedance Z, a first internal output terminal being output a third differential signal from the first external input/output terminal, a second internal output terminal being output a fourth differential signal from the second external input/output terminal as the fourth differential signal forming a signal pair in conjunction with the third differential signal, a first bipolar transistor having an emitter thereof connected to a first current source and the first external input/output terminal, a base thereof connected to the first internal input terminal, and a collector thereof connected to an emitter of a second bipolar transistor and the first internal output terminal, wherein the third differential signal is amplified by the first bipolar transistor and output from the collector of the first bipolar transistor to the first internal output terminal, the second bipolar transistor having the emitter thereof connected to the collector of the first bipolar transistor and the first internal output terminal, and a base thereof connected to the second internal input terminal, a third bipolar transistor having an emitter thereof connected to a second current source and the second external input/output terminal, a base thereof connected to the third internal input terminal, and a collector thereof connected to the emitter of a fourth bipolar transistor and the second internal output terminal, and the fourth bipolar transistor having an emitter thereof connected to the collector of the third bipolar transistor and the second internal output terminal, and a base thereof connected to the fourth internal input terminal, wherein a current generated by the first current source is set so that a resistance of the emitter of the first bipolar transistor becomes equal to Z, and wherein a current generated by the second current source is set so that a resistance of the emitter of the second bipolar transistor becomes equal to Z.

13. An electronic apparatus comprising:
a first full duplex transmission circuit;
a second full duplex transmission circuit; and
a transmission line connecting an external input/output terminal of the first full duplex transmission circuit to an external input/output terminal of the second full duplex transmission circuit, each of the first and second full duplex transmission circuits comprising:
a first internal input terminal receiving a signal to be transmitted,
a second internal input terminal receiving a signal having an amplitude equal to G/2 times an amplitude of the signal to be transmitted and having a same phase as a phase of the signal to be transmitted, where G>1,
an external input/output terminal connected to the transmission line having a characteristic impedance Z,
an internal output terminal being output a received signal from the external input/output terminal,
a first metal oxide semiconductor transistor having a source thereof connected to a first current source and the external input/output terminal, a gate thereof connected to the first internal input terminal, and a drain thereof connected to the source of a second metal oxide semiconductor transistor and the internal output terminal, wherein the received signal is amplified by the first metal oxide semiconductor transistor and output from the drain of the first metal oxide semiconductor transistor to the internal output terminal, and
the second metal oxide semiconductor transistor having the source thereof connected to the drain of the first metal oxide semiconductor transistor, the second current source and the internal output terminal, and a gate thereof connected to the second internal input terminal,
wherein a current generated by the first current source and a size of the first metal oxide semiconductor transistor are set so that a transconductance of the first metal oxide semiconductor transistor becomes equal to 1/Z, and
wherein a current generated by the second current source and a size of the second metal oxide semiconductor transistor are set so that a transconductance of the second metal oxide semiconductor transistor becomes equal to 1/G times the transconductance of the first metal oxide semiconductor transistor.

14. An electronic apparatus comprising:
a first full duplex transmission circuit;
a second full duplex transmission circuit; and
a transmission line connecting an external input/output terminal of the first full duplex transmission circuit to an external input/output terminal of the second full duplex transmission circuit, each of the first and second full duplex transmission circuits comprising:
a first internal input terminal receiving a signal to be transmitted,
a second internal input terminal receiving a signal having an amplitude equal to G/2 times an amplitude of the signal to be transmitted, and having a same phase as a phase of the signal to be transmitted, where G>1,
an external input/output terminal connected to the transmission line having a characteristic impedance Z,
an internal output terminal being output a received signal from the external input/output terminal,
a first bipolar transistor having an emitter thereof connected to a first current source and the external input/output terminal, a base thereof connected to the first internal input terminal, and a collector thereof connected to an emitter of a second bipolar transistor and the internal output terminal, wherein the received signal is amplified by the first bipolar transistor and output from the collector of the first bipolar transistor to the internal output terminal, and
the second bipolar transistor having the emitter thereof connected to the collector of the first bipolar transistor, the second current source and the internal output terminal, and a base thereof connected to the second internal input terminal,
wherein a current generated by the first current source is set so that a resistance of the emitter of the first bipolar transistor becomes equal to Z, and
a current generated by the second current source is set so that a resistance of the emitter of the second bipolar transistor becomes equal to G times the resistance of the emitter of the first bipolar transistor.

15. An electronic apparatus comprising:
a first full duplex transmission circuit;
a second full duplex transmission circuit; and
first and second transmission lines connecting first and second external input/output terminals of the first full duplex transmission circuit to first and second external input/output terminals of the second full duplex transmission circuit, each of the first and second full duplex transmission circuits comprising:
a first internal input terminal receiving a first differential signal,
a second internal input terminal receiving a signal having an amplitude equal to G/2 times an amplitude of the first differential signal and having a same phase as a phase of the first differential signal, where G>1,
a third internal input terminal receiving a second differential signal forming a signal pair in conjunction with the first differential signal,
a fourth internal input terminal receiving a signal having an amplitude equal to G/2 times an amplitude of the second differential signal and having a same phase as a phase of the second differential signal,
a first external input/output terminal connected to the first transmission line having a characteristic impedance Z, a second external input/output terminal connected to the second transmission line having a characteristic impedance Z,
a first internal output terminal being output a third differential signal from the first external input/output terminal,
a second internal output terminal being output a fourth differential signal from the second external input/output terminal as the fourth differential signal forming a signal pair in conjunction with the third differential signal,
a first metal oxide semiconductor transistor having a source thereof connected to a first current source and the first external input/output terminal, a gate thereof connected to the first internal input terminal, and a drain thereof connected to a source of a second metal oxide semiconductor transistor and the first internal output terminal, wherein the third differential signal is amplified by the first metal oxide semiconductor transistor and output from the drain of the first metal oxide semiconductor transistor to the first internal output terminal,
the second metal oxide semiconductor transistor having the source thereof connected to the drain of the first metal oxide semiconductor transistor, the second current source and the first internal output terminal, and a gate thereof connected to the second internal input terminal,
a third metal oxide semiconductor transistor having a source thereof connected to a third current source and the second external input/output terminal, a gate thereof connected to the third internal input terminal, and a drain thereof connected to a source of a fourth metal oxide semiconductor transistor and the second internal output terminal, and
the fourth metal oxide semiconductor transistor having the source thereof connected to the drain of the third metal oxide semiconductor transistor, the fourth current source and the second internal output terminal, and a gate thereof connected to the fourth internal input terminal,
wherein a current generated by the first current source and a size of the first metal oxide semiconductor transistor are set so that a transconductance of the first metal oxide semiconductor transistor becomes equal to 1/Z,
wherein a current generated by the second current source and a size of the second metal oxide semiconductor transistor are set so that transconductance of the second metal oxide semiconductor transistor becomes equal to 1/G times the transconductance of the first metal oxide semiconductor transistor,
wherein a current generated by the third current source and a size of the third metal oxide semiconductor transistor are set so that a transconductance of the third metal oxide semiconductor transistor becomes equal to 1/Z, and
wherein a current generated by the fourth current source and a size of the fourth metal oxide semiconductor transistor are set so that a transconductance of the fourth metal oxide semiconductor transistor becomes equal to 1/G times the transconductance of the third metal oxide semiconductor transistor.

16. An electronic apparatus comprising:
a first full duplex transmission circuit;
a second full duplex transmission circuit; and
first and second transmission lines used for connecting first and second external input/output terminals of the first full duplex transmission circuit to first and second external input/output terminals of the second full duplex transmission circuit, each of the first and second full duplex transmission circuits comprising:
a first internal input terminal receiving a first differential signal,
a second internal input terminal receiving a signal having an amplitude equal to G/2 times an amplitude of the first differential signal and having a same phase as a phase of the first differential signal, where G>1,
a third internal input terminal receiving a second differential signal forming a signal pair in conjunction with the first differential signal,
a fourth internal input terminal receiving a signal having an amplitude equal to G/2 times an amplitude of the second differential signal and having a same phase as a phase of the second differential signal,
a first external input/output terminal connected to the first transmission line having a characteristic impedance Z,
a second external input/output terminal connected to the second transmission line having a characteristic impedance Z,
a first internal output terminal being output a third differential signal from the first external input/output terminal,
a second internal output terminal being output a fourth differential signal from the second external input/output terminal as the fourth differential signal forming a signal pair in conjunction with the third differential signal;
a first bipolar transistor having an emitter thereof connected to a first current source and the first external input/output terminal, a base thereof connected to the first internal input terminal, and a collector thereof connected to an emitter of a second bipolar transistor and the first internal output terminal, wherein the third differential signal is amplified by the first bipolar transistor and output from the collector of the first bipolar transistor to the first internal output terminal,
the second bipolar transistor having the emitter thereof connected to the collector of the first bipolar transistor, the second current source and the first internal output terminal, and a base thereof connected to the second internal input terminal,
a third bipolar transistor having an emitter thereof connected to a third current source and the second external input/output terminal, a base thereof connected to the third internal input terminal, and a collector thereof connected to the emitter of a fourth bipolar transistor and the second internal output terminal, and
the fourth bipolar transistor having an emitter thereof connected to the collector of the third bipolar transistor, the fourth current source and the second internal output terminal, and a base thereof connected to the fourth internal input terminal,
wherein a current generated by the first current source is set so that a resistance of the emitter of the first bipolar transistor becomes equal to z,
wherein a current generated by the second current source is set so that a resistance of the emitter of the second bipolar transistor becomes equal to G times the resistance of the emitter of the first bipolar transistor, wherein a current generated by the third current source is set so that a resistance of the emitter of the third bipolar transistor becomes equal to Z, and wherein a current generated by the fourth current source is set so that a resistance of the emitter of the fourth bipolar transistor becomes equal to G times the resistance of the emitter of the third bipolar transistor.

17. The electronic apparatus according to claim 9, further comprising:

a processing section configured to generate a signal of image data; and a display section configured to display the image data, wherein the signal of the image data is supplied to the internal input terminal of the first full duplex transmission circuit, transmitted to the second full duplex transmission circuit through the transmission line, output from the internal output terminal of the second full duplex transmission circuit and supplied to the display section.

18. The full duplex transmission circuit according to claim 1, wherein the received signal is amplified by the first metal oxide semiconductor transistor without being inverted.

19. The full duplex transmission circuit according to claim 1, wherein the received signal from the external input/output terminal is terminated by a source resistance of the first metal oxide semiconductor transistor.

* * * * *